US009628795B2

United States Patent
Zhang et al.

(10) Patent No.: US 9,628,795 B2
(45) Date of Patent: Apr. 18, 2017

(54) BLOCK IDENTIFICATION USING DISPARITY VECTOR IN VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 14/333,084

(22) Filed: Jul. 16, 2014

(65) Prior Publication Data

US 2015/0023423 A1 Jan. 22, 2015

Related U.S. Application Data

(60) Provisional application No. 61/847,522, filed on Jul. 17, 2013.

(51) Int. Cl.
| | |
|---|---|
| *H04N 7/12* | (2006.01) |
| *H04N 11/02* | (2006.01) |
| *H04N 11/04* | (2006.01) |
| *H04N 19/583* | (2014.01) |
| *H04N 19/597* | (2014.01) |
| *H04N 19/52* | (2014.01) |
| *H04N 19/176* | (2014.01) |
| *H04N 19/51* | (2014.01) |

(52) U.S. Cl.
CPC ..... *H04N 19/00733* (2013.01); *H04N 19/176* (2014.11); *H04N 19/51* (2014.11); *H04N 19/52* (2014.11); *H04N 19/597* (2014.11)

(58) Field of Classification Search
CPC ........... H04N 19/00733; H04N 19/176; H04N 19/51; H04N 19/597; H04N 19/52
USPC ...................................... 375/240.16
See application file for complete search history.

(56) References Cited

U.S. PATENT DOCUMENTS

| | | | |
|---|---|---|---|
| 2003/0152150 A1* | 8/2003 | Fujimoto ............... | H04N 19/51 375/240.24 |
| 2010/0322315 A1* | 12/2010 | Hasuo .................. | H04N 19/139 375/240.16 |
| 2011/0044550 A1* | 2/2011 | Tian ..................... | H04N 19/597 382/238 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Mehrdad Dastouri
*Assistant Examiner* — Jared Walker
(74) *Attorney, Agent, or Firm* — Shumaker & Sieffert, P.A.

(57) ABSTRACT

Techniques are described for determining a block in a reference picture in a reference view based on a disparity vector for a current block. The techniques start the disparity vector from a bottom-right pixel in a center 2×2 sub-block within the current block, and determine a location within the reference picture to which the disparity vector refers. The determined block covers the location referred to by the disparity vector based on the disparity vector starting from the bottom-right pixel in the center 2×2 sub-block within the current block.

15 Claims, 14 Drawing Sheets

(56) References Cited

U.S. PATENT DOCUMENTS

| | | | |
|---|---|---|---|
| 2012/0163466 A1* | 6/2012 | Sugio | H04N 19/139 375/240.16 |
| 2013/0128980 A1* | 5/2013 | Shimizu | H04N 19/52 375/240.16 |
| 2015/0003521 A1 | 1/2015 | Thirumalai et al. | |
| 2015/0003529 A1 | 1/2015 | Thirumalai et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, 27 Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Guillemot, et al., "3D-CE5.h: Additional merge candidates derived from shifted disparity candidate predictors", JCT-3V Meeting, MPEG Meeting, Jan. 17-23, 2013; Geneva, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-C0148, XP030130564, 6 pp.

Lin, et al., "3D-CE5.h related: Additional inter-view merging candidate", JCT-3V Meeting; Apr. 20-26, 2013; Incheon; (The Joint Collaborative Team on 3D Video Coding Extension Development of ISO/IEC JTC1/SC29/WG11 and ITU-T SG.6); URL: http://phenix.int-evry.fr/jct2/, No. JCT3V-D0109, XP030130773, 3 pp.

Tech, et al., "3D-HEVC Test Model 4", JCT-3V Meeting; Incheon; (The Joint Collaborative Team on 3D Video Coding Extension Development of ISO/IEC JTC1/SC29/WG11 and ITU-T SG.16), No. JCT3V-D1005, Apr. 20-26, 2013, XP030130998, 88 pp.

Thirumalai, et al., "Inter-view motion vector prediction for depth coding", JCT-3V Meeting; Vienna; (The Joint Collaborative Team on 3D Video Coding Extension Development of ISO/IEC JTC1/SC29/WG11 and ITU-T SG.16), No. JCT3V-E0133, Jul. 27-Aug. 2, 2013, XP030131151, 5 pp.

Tian, et al.,"CE1.h: Backward View Synthesis Prediction using Neighbouring Blocks", JCT-3V Meeting; 103. MPEG Meeting; Jan. 16-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-00152, XP030130568, 5 pp.

ITU-T H.223, Series H: Audiovisual and Multimedia Systems, Infrastructure of audiovisual services—Transmission multiplexing and synchronization, Multiplexing protocol for low bit rate multimedia communication, Jul. 2001, 74 pp.

International Search Report and Written Opinion from International Application No. PCT/US2014/047000, dated Oct. 1, 2014, 11 pp.

Response to Written Opinion dated Oct. 1, 2014, from International Application No. PCT/US2014/047000, filed on Jan. 8, 2015, 5 pp.

International Preliminary Report on Patentability from International Application No. PCT/US2014/047000, dated Sep. 23, 2015, 6 pp.

A. Norkin et al., "High Efficiency Video Coding (HEVC): Algorithms and Architectures" by Sze et al. Aug. 23, 2014 (p. 180).

* cited by examiner

Time-first coding

An example MVC temporal and inter-view prediction structure.

Temporal neighboring blocks in NBDV.

Depth block derivation from a reference view to do BVSP prediction

Derivation of inter-view predicted motion vector candidate for merge/skip mode

Derivation of MVI candidate for depth coding

Prediction structure of advanced residual prediction.

Prediction structure of advanced residual prediction.

BLOCK IDENTIFICATION USING DISPARITY VECTOR IN VIDEO CODING

This application claims the benefit of U.S. Provisional Application No. 61/847,522, filed on Jul. 17, 2013, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for identifying a reference block (also referred to as a corresponding block) with a disparity vector of a current block in a video coding process. The reference block is located in a view different than the view that includes in the current block. In some examples, the techniques may define a start position of the disparity vector of the current block. For instance, x- and y-components of the disparity vector may be added to or subtracted from the x- and y-coordinates of the start position of the disparity vector to determine a location of a reference block referred to by the disparity vector. Video coding efficiency or gains may be realized by identifying the reference block with a disparity vector with a start position described in this disclosure.

In one example, the disclosure describes a method of decoding video data, the method comprising determining a disparity vector for a current block in a current picture in a current view, determining a block in a reference picture in a reference view based on a location in the reference picture to which the disparity vector refers based on the disparity vector starting from a bottom-right pixel in a center 2×2 sub-block within the current block, and inter-prediction decoding the current block based on the determined block.

In one example, the disclosure describes a method of encoding video data, the method comprising determining a disparity vector for a current block in a current picture in a current view, determining a block in a reference picture in a reference view based on a location in the reference picture to which the disparity vector refers based on the disparity vector starting from a bottom-right pixel in a center 2×2 sub-block within the current block, and inter-prediction encoding the current block based on the determined block.

In one example, the disclosure describes a device for video coding, the device comprising a video data memory configured to store video data, and a video coder comprising one or more processors and configured to determine a disparity vector for a current block in a current picture in a current view based on the stored video data, determine a block in a reference picture in a reference view based on a location in the reference picture to which the disparity vector refers based on the disparity vector starting from a bottom-right pixel in a center 2×2 sub-block within the current block, and inter-prediction code the current block based on the determined block.

In one example, the disclosure describes a computer-readable storage medium having instructions stored thereon that when executed cause one or more processors of a device for video coding to determine a disparity vector for a current block in a current picture in a current view, determine a block in a reference picture in a reference view based on a location in the reference picture to which the disparity vector refers based on the disparity vector starting from a bottom-right pixel in a center 2×2 sub-block within the current block, and inter-prediction code the current block based on the determined block.

In one example, the disclosure describes a device for video coding, the device comprising means for determining a disparity vector for a current block in a current picture in a current view, means for determining a block in a reference picture in a reference view based on a location in the reference picture to which the disparity vector refers based on the disparity vector starting from a bottom-right pixel in a center 2×2 sub-block within the current block, and means for inter-prediction coding the current block based on the determined block.

The details of one or more examples are set forth in the accompanying drawings and the description below. Other features, objects, and advantages will be apparent from the description, drawings, and claims.

DETAILED DESCRIPTION

Figure 1:
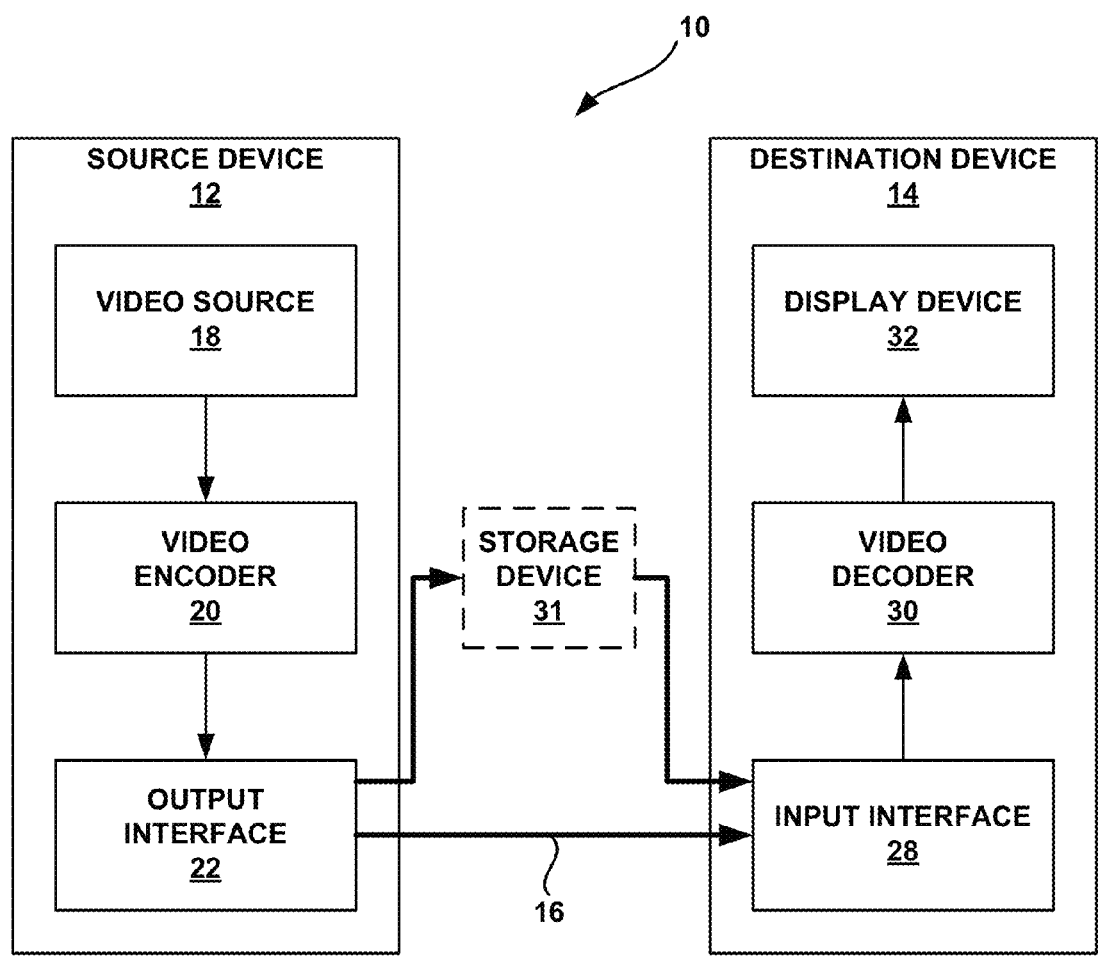
FIG. 1 is a block diagram illustrating an example video encoding and decoding system that may implement or otherwise utilize techniques for block identification.

This disclosure describes various techniques for coding of three-dimensional (3D) video content that includes texture views and depth views. More specifically, when inter-view motion prediction is applied to identify a block in the reference, different methods are provided. The techniques may be performed, in some aspects, by a video encoder. In other aspects, the techniques may be performed by a video decoder. In addition, such methods could be performed in other devices, such as transcoders, media aware network elements (MANEs), or the like. In this disclosure, the techniques will be described with respect to video encoders and decoders for purposes of illustration. For example, the video encoders and decoders may utilize coding tools that require access to a corresponding block in a reference view associated with current block such as in advanced residual coding or inter-view prediction coding.

In some examples of video coding (e.g., encoding or decoding), a video coder (e.g., video encoder or video decoder) determines a disparity vector for a current block that is to be coded (e.g., encoded or decoded). The disparity vector refers to a reference block (also referred to as a corresponding block) in a view other than the view that includes the current block. The disparity vector is used by various video coding tools that are used to encode or decode the current block such as inter-view motion prediction, inter-view residual prediction, and video coding tools where the disparity vector is converted to a disparity motion vector, as a few examples. The techniques described in this disclosure describe ways in which to identify the reference block based on the disparity vector for the current block.

To identify the reference block, the video coder may add the coordinates of a start position to the values of the disparity vector. For example, the disparity vector includes an x-component and a y-component. The video coder adds the x-coordinate of the start position to the x-component of the disparity vector, and adds the y-coordinate of the start position to the y-coordinate of the disparity vector. The resulting values may be the x-coordinate and y-coordinate of a pixel at an end position. The video coder may determine a block that encompasses a location (i.e., the pixel) with the resulting coordinate values, and identify that block as the reference block for the current block.

In some examples, the video coder may set the start position of the disparity vector such that the disparity vector refers to a pixel located at location C0 in the reference picture of the reference view. The video coder determines location C0 in the reference picture of the reference view based on the value of the disparity vector (e.g., based on the x-component and y-component of the disparity vector).

An equation to determine the location C0, based on the value of the disparity vector, in the reference picture of the reference view is described in more detail below. In general, the start position of the disparity vector is determined so that the disparity vector refers to location C0 as being the top-left pixel in a center sub-block of the current block. The center of the current block includes four pixels that can be considered as forming a 2×2 sub-block (e.g., the center sub-block). If the start position of the disparity vector is the top-left pixel in this 2×2 sub-block, then the disparity vector refers to location C0 in the reference picture of the reference view (e.g., the end point of the disparity vector is location C0 in the reference picture).

In some examples, the location of the 2×2 center sub-block may be calculated by dividing the length and width of the block by two. The x-coordinate of the top-left corner of the 2×2 center sub-block is the x-coordinate of the top-left corner of the current block plus the width divided by two minus one. The y-coordinate of the top-left corner of the 2×2 center sub-block is the y-coordinate of the top-left corner of the current block pulse the height divide by two minus one. The top-right corner of the 2×2 center sub-block is the pixel located to the immediate right of the pixel in the top-left corner of the 2×2 center sub-block, the bottom-left corner of the 2×2 center sub-block is the pixel located to immediately below the pixel in the top-left corner of the 2×2 center sub-block, and bottom-right corner of the 2×2 center sub-block is the pixel located to the immediate right of the pixel in the bottom-left corner, immediately below the pixel in the top-right corner, and diagonally right-bottom of the top-left corner of the 2×2 center sub-block.

The video coder may determine a block in the reference picture that covers (i.e., includes) the pixel located at location C0. The video coder may then identify the determined block as being the reference block (also referred to as the corresponding block) for the current block that is used for video coding tools which rely on a disparity vector (e.g., for inter-view motion prediction, inter-view residual prediction, and/or block-based view synthesis prediction, as a few non-limiting examples).

However, utilizing the block that covers the pixel located at location C0 as the reference block may not provide sufficient coding efficiencies. For instance, statistical trends may indicate a block that covers a pixel located at a location other than location C0 may be a better candidate as the reference block for the current block. Accordingly, setting a start position of a disparity vector equal to a location of a top-left pixel of the 2×2 center sub-block within the current block may result in identifying a block that may not provide optimum coding efficiencies.

This disclosure describes example techniques to determine a location of a pixel other than a pixel located at location C0 in a reference picture of the reference view, and identifying a block that covers that other pixel as a reference block (e.g., corresponding block) for a current block. As one example, the disclosure describes techniques to determine a location of a pixel in the reference picture located to the bottom-right of the pixel located at location C0. For instance, the pixel located to the bottom-right of the pixel located at location C0 may be considered as being located at (1, 1) relative to, and not in absolute terms within the reference picture, the location of the pixel located at C0.

The location of the pixel in the reference picture located to the bottom-right of the pixel located at C0 is referred to as location C3 in this disclosure. The video coder determines location C3 based on the value of the disparity vector (e.g., x- and y-components of the disparity vector), and an equation to determine location C3 which is described in more detail below. In examples where the video coder determines the pixels located at location C3, the video coder may determine the block that covers (i.e., includes) the pixel located at location C3, and identify the determined block as the reference block for the current block.

As described above, location C3 is located one pixel to the right and one pixel to the bottom of location C0. Therefore, if the start position of the disparity vector within the current block is also changed by one pixel to the right and one pixel to the bottom, the disparity vector will now refer to location C3. For instance, as described above, if the disparity vector starts from the top-left pixel of the center 2×2 sub-block within the current block, then the disparity vector refers to location C0 in the reference picture of the reference view. Accordingly, if the start position of the disparity vector is shifted by one pixel to the right, and one pixel to the bottom (i.e., the bottom-right pixel of the center 2×2 sub-block within the current block), then the disparity vector refers to location C3.

In one or more example techniques described in this disclosure, the video coder may determine the block within the reference picture of the reference view that covers the location referred to by the disparity vector that starts from the bottom-right pixel of the center 2×2 sub-block and identify that block as the reference block, rather than determining the block that covers the location referred to by the disparity vector that starts from the top-left pixel of the center 2×2 sub-block. In other words, the video coder may identify the block in the reference picture in the reference view that covers the location C3, which is referred to by a disparity vector that starts from the bottom-right pixel of the center 2×2 sub-block, as the reference block, rather than the block that covers the location C0, which is referred to by a disparity vector that starts from the top-left pixel of the center 2×2 sub-block.

In some examples, rather than determining location C3, the video coder may determine the location of the pixel located to the right of the pixel located at location C0 (referred to as the pixel located at location C1) by starting the disparity vector from the top-right pixel of the center 2×2 sub-block or determine the location of the pixel located below the pixel located at location C0 (referred to as the pixel located at location C2) by starting the disparity vector from the bottom-left pixel of the center 2×2 sub-block. In these examples, the video coder may determine the block in the reference picture in the reference view that covers the pixel located at location C1 or the pixel located at location C2, and identify the determined block as the reference block for the current block.

In the above examples, to determine the pixel located at one of the locations C0, C1, C2, or C3, the video coder may set the start position of the disparity vector so that the disparity vector points to the pixel located at one of locations C0, C1, C2, or C3. For instance, the video coder adds the coordinate values of the start position to the value of the disparity vector so that the resulting coordinate values are those for one of locations C0, C1, C2, or C3. In this way, by properly setting the start position of the disparity vector, the video coder can cause the disparity vector to refer to one of the pixels located at one of locations C0, C1, C2, or C3.

If the block that covers the pixel located at location C3 in the reference picture of the reference view does not include motion information (e.g., is intra-predicted) or the motion information is unavailable for the video coding tool that relies on the disparity vector and that is used for coding the current block, the video coder may determine that this video coding tool is not available for the current block. However, the techniques are not so limited.

In some examples, the video coder may determine the block in the reference picture of the reference view that covers the pixel located at location C3, and if the motion information for the block associated with location C3 is unavailable for one or more of the video coding tools that rely on a disparity vector (e.g., because the block is intra-predicted or the motion information is not usable), the video coder may subsequently determine the block in the reference picture of the reference view that covers the pixel located at location C0. The video coder may then identify the block that covers the pixel located at location C0 as the reference block. In some examples, the video coder may perform the opposite steps (e.g., if block that covers pixel located at location C0 does not include motion information usable for video coding tools that rely on the disparity vector, the video coder identifies the block that covers the pixel located at location C3 as the reference block).

If the block that covers the pixel located at location C3 and the block that covers the pixel located at location C0 do not include motion information that is available for the video coding tools that rely on the disparity vector, the video coder may determine that one or more of the video coding tools that rely on the disparity vector are not available for the current block. In some examples, rather than determining that one or more of the video coding tools are not available, the video coder may determine whether the respective block that covers the pixel located at location C1 or location C2 includes motion information available for one or more of the video coding tools, and identify such a block as the reference block for the current block.

There may be additional options as well, such as blocks located at locations BR0, BR1, or BR2 described in more detail below. For instance, the video coder may determine whether the motion information for a block located at locations BR0, BR1, or BR2 in the reference picture of the reference view includes motion information usable or desirable for one or more video coding tools that rely on the disparity vector, and identify the determined one of blocks BR0, BR1, or BR2 as the reference block for the current block.

The location of block BR0 in the reference picture of the reference view equals the location of the block to the bottom-right of the block referred to by the disparity vector if the disparity vector starts from the top-left corner of the current block. The location of block BR1 is to the bottom-right of block BR0, and the location of block BR2 is to the bottom-right of block BR1. For instance, in relative terms, and not absolute location within the reference picture, block BR1 is located at (1, 1) relative to block BR0, and block BR2 is located at (2, 2) relative to block BR0.

In some examples, the video coder may determine a location in the reference picture of a reference view based on the disparity vector starting from the top-left corner of the current block. The video coder may shift and quantize the determined location so that determined location is aligned as the top-left corner of a 4×4 block in the reference picture of the reference view. The video coder may then further shift (e.g., rightwards, downwards, or a combination of both) the determined location to determine a location of another block within the reference picture. The video coder may identify this block as the reference block for the current picture.

The above example techniques for identifying the reference block are described with respect to the video coder determining the block that covers the pixel at location C3, then C0, then C1, then C2, then the block at location BR0, then BR1, and then BR2, and then the shifted locations. However, the techniques described in this disclosure are not so limited. Other permutations of the order in which blocks in the reference picture of the reference view are checked are possible and contemplated by the techniques described in this disclosure.

Moreover, it is not necessary for the video coder to check each one of these blocks to identify the reference block. The video coder may truncate the search for a reference block as soon as the video coder determines (i.e., based on the video coding determining) that one of these blocks is suitable for one or more of the video coding tools that rely on the disparity vector.

In some examples, the video coder may truncate the search for a reference block after checking a subset of these example locations, including only checking one block, even if no reference block is identified. For instance, the video coder may determine whether the block that covers the pixel located at location C3 includes motion information available for one or more video coding tools. If the motion information is not available (e.g., because the block is intra-coded or the motion vector of the block is a disparity motion vector or the motion vector of the block refers to a picture not in the reference picture list of the current block), the video coder may truncate the search for a reference block and determine that no reference block is available even though there may be other possible blocks to check.

The above techniques for identifying the reference block referred to by the disparity vector are described separately merely to assist with understanding. However, it should be understood that the techniques described in this disclosure are not so limited, and may be combined together. Furthermore, the above example techniques may be generalized to any scenario when identifying a syntax element or variable associated with a block is needed.

Also, the above techniques are described with respect to an implicit technique for identifying the reference block (e.g., the reference block is always the block that covers pixel located at location C3 or first check reference block that covers location C3, and then move to location C0, etc.). These techniques are implicit in the sense that the video encoder does not need to signal information to the video decoder for how to identify the reference block (e.g., no explicit signaling of information for how to identify the reference block is needed). In some examples, the video encoder may check multiple blocks that each includes motion information for video coding tools that rely on the disparity vector, and determine which block provides the most coding efficiency among the multiple blocks that are checked. The video encoder may then explicitly signal to the video decoder information indicative of the block that is used as the reference block from which the video decoder can determine which block should be the reference block.

Furthermore, the above techniques are described with respect to video coding tools that rely on a disparity vector. However, the techniques described in this disclosure are not so limited. For instance, the above techniques may be generalized to any scenario when identifying a syntax element or variable associated with a block is needed.

In general, in the techniques described in this disclosure, the video coder may determine a disparity vector for a current block in a current picture in a current view. The video coder may determine a block in a reference picture in a reference view based on a location in the reference picture to which the disparity vector refers (e.g., determine the block that covers location C3 in the reference picture).

The video coder may inter-prediction code (e.g., encode or decode) the current block based on the determined block. For example, as described in more detail below, in inter-view motion prediction, the video coder forms a list of motion vector predictors. The motion information of the determined block in the reference picture may be one of the motion vector predictors. If the motion vector information of the determined block is selected to inter-prediction code (e.g., inter-prediction encode or inter-prediction decode) the current block, then the video coder inter-prediction codes the current block based on the motion information of the determined block in the reference picture.

In some examples, the video coder may convert the disparity vector to a disparity motion vector for the current block. In these examples, the disparity motion vector for the current block refers to the reference block, which can be considered as a predictive block. For example, the video encoder includes a feedback path that stores a reconstruction of the reference block for inter-prediction encoding purposes, and the video coder stored a reconstruction of reference block for inter-prediction decoding purposes. The reconstruction of the reference block may be considered as a predictive block. The video coder determines a residual between a reconstruction of a reference block (e.g., predictive block) and the current block for coding the current block.

FIG. 1 is a block diagram illustrating an example video encoding and decoding system 10 that may be configured to implement or otherwise utilize techniques for block identification. For example, such block identification techniques may be useful during inter-view motion prediction, inter-view residual prediction, examples where the disparity vector is converted to a disparity motion vector, or other video coding tools that rely on a disparity vector. Inter-view motion prediction, inter-view residual prediction, and examples where the disparity vector is converted to a disparity motion vector are described in more detail below.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via link 16. Link 16 may comprise any type of medium or device capable of moving the encoded video data from source device 12 to destination device 14. In one example, link 16 may comprise a communication medium (wired or wireless medium) to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 of source device 12 to a storage device, such as storage device 31. Similarly, encoded data may be accessed from the storage device 31 by input interface 28 of destination device 14. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and video decoder 30 of destination device 14 may be configured to implement the example techniques described in this disclosure. In some examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example, and the techniques described in this disclosure may be performed by any digital video encoding and/or decoding device. Although generally the techniques of this disclosure are performed by a video encoding/decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14 (e.g., for video streaming, video playback, video broadcasting, or video telephony).

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a link 16.

Input interface 28 of destination device 14 receives information from link 16 and/or storage device 31. The received information may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, and may generally conform to the HEVC Test Model (HM). The HEVC standard is developed by the Joint Collaboration Team on Video Coding (JCT-VC) of ITU-T Video Coding Experts Group (VCEG) and ISO/IEC Motion Picture Experts Group (MPEG). The latest text specification of HEVC, draft 10 (WD10), is available from http://phenix.int-evry.fr/jct/doc_end_user/documents/12_Geneva/wg11/JCTVC-L1003-v34.zip, the contents of which are incorporated by reference herein in their entirety.

In some examples, video encoder 20 and video decoder 30 may operate according to various extensions currently under development such as the MV-HEVC, 3D-HEVC, 3D-AVC, or other standards for multiview coding. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Other examples of video coding standards include MPEG-2, ITU-T H.263, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Video encoder 20 and video decoder 30 may configured according to one or more of the above example standards, or may not be configured according to any particular standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, integrated circuit (IC), software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

When the techniques are implemented partially in software, a device may store instructions for the software in a suitable, computer-readable storage medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the HM describes that a video frame or picture may be divided into a sequence of treeblocks or largest coding units (LCU) that include both luma and chroma samples. The HEVC standard also refers to LCUs as "coding tree units," or CTUs. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded or decoded (i.e., intra-predicted or inter-prediction encoded or decoded), data for the PU may be included in a residual quadtree (RQT), which may include data describing an intra-prediction mode for a TU corresponding to the PU. As another example, when the PU is inter-mode encoded or decoded (i.e., inter-predicted or inter-prediction encoded or decoded), the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding (i.e., intra-prediction encoding or decoding or inter-prediction encoding or decoding) using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In some examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

The above describes example ways video coding techniques in the HEVC standard. These example video coding techniques are also extendable to multiview video coding techniques such as those of MV-HEVC, 3D-HEVC, H.264/MVC, and 3D-AVC. For ease of illustration and description only, the techniques described in this disclosure are described with respect to 3D-HEVC. However, the example techniques may be extendable to other standards or non-standards based multiview video coding techniques as well.

In general, in multiview video coding there exist multiple views, where each corresponding picture in each view includes similar video content. However, there may be horizontal and/or vertical disparity between the video blocks in corresponding pictures in the different views. It is this disparity between the pictures that causes the 3D viewing experience. As an example, display 32 may display pictures from two or more views. With specialized goggles (or other techniques), the left eye of the viewer receives pictures from one of the views and not the others, and the right eye of the viewer receives pictures from one of the other views and no other view. The viewer's brain resolves the disparity between the pictures of these different views by causing the viewer to experience 3D viewing.

In multiview video coding, for each view there may be a texture component and a corresponding depth component (referred to as depth map). The texture component includes the actual video data, and can be considered as a picture. The depth component indicates the relative depth of pixels in the corresponding depth component. The depth component may not be necessary in every example. In some examples, one of the views may include the depth component, but other views may not.

For video coding, the HEVC standard and other non-multiview video coding techniques allow for inter-prediction between pictures that are output or displayed at different times (e.g., a current picture is inter-predicted with a picture that is to be displayed at a different time). In addition to allowing such inter-prediction, techniques for multiview video coding allow for inter-view prediction, where one picture is inter-predicted with another picture in a different view.

To assist with understanding multiview video coding, the following provides some additional information. Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the CU/PU level in HEVC needs to be re-designed and can be fully reused for MV-HEVC. For 3D-HEVC, new coding tools, including those in coding unit/prediction unit level, for both texture and depth views may be included and supported. The latest software 3D-HTM for 3D-HEVC can be downloaded from the following link: [3D-HTM version 7.0]: https://hevc.hhi.fraunhofer.de/svn/svn 3DVCSoftware/tags/HTM-7.0/. The latest reference software description as well as the working draft of 3D-HEVC is available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013. This document can be downloaded from the following link: http://phenix.it-sudparis.eu/jct2/doc_end_user/documents/4_Incheon/wg11/JCT3V-D1005-v1.zip.

MVC is an extension of H.264/AVC. The MVC specification is briefly discussed in the sections and sub-sections of this disclosure below. In this disclosure, when multiview video coding is spelled out, the disclosure is referring generically to video coding where multiple views exist. When the acronym MVC is used, the disclosure is referring to the video coding standard which is an extension of H.264/AVC (sometimes referred to as H.264/MVC).

Figure 2:
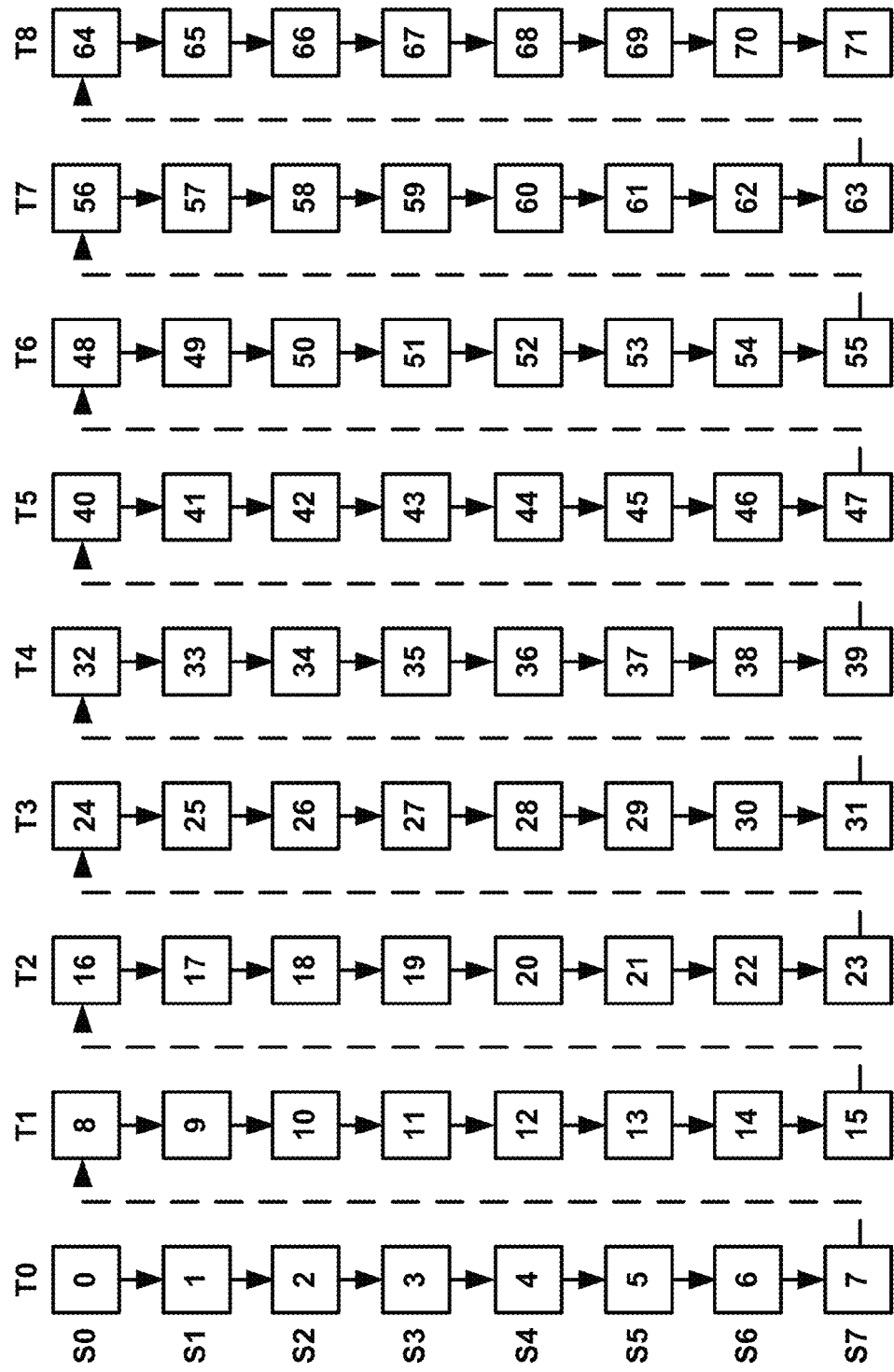
FIG. 2 is a conceptual diagram illustrating coding a multiview video coding sequence.

FIG. 2 is a conceptual diagram illustrating a multiview video coding sequence. For instance, a typical multiview video decoding order (i.e. bitstream order) is shown in FIG. 2. The decoding order arrangement is referred to as time-first coding. Each access unit (AU) is defined to contain the coded pictures of all the views for one output time instance. Note that the decoding order of access units may not be identical to the output or display order.

For instance, in FIG. 2, S0-S7 refer to different views, and S0 may be considered as a base view and the others as dependent views. In FIG. 2, pictures identified as 0, 8, 16, 24 . . . belong to view S0, pictures identified as 1, 9, 17, 25 . . . belong to view S1, and so forth. One AU includes picture information for all pictures of the same or substantially similar output time instance. For example, pictures 0-7 belong to views S0-S7, respectively, and are output at approximately time T0.

Figure 3:
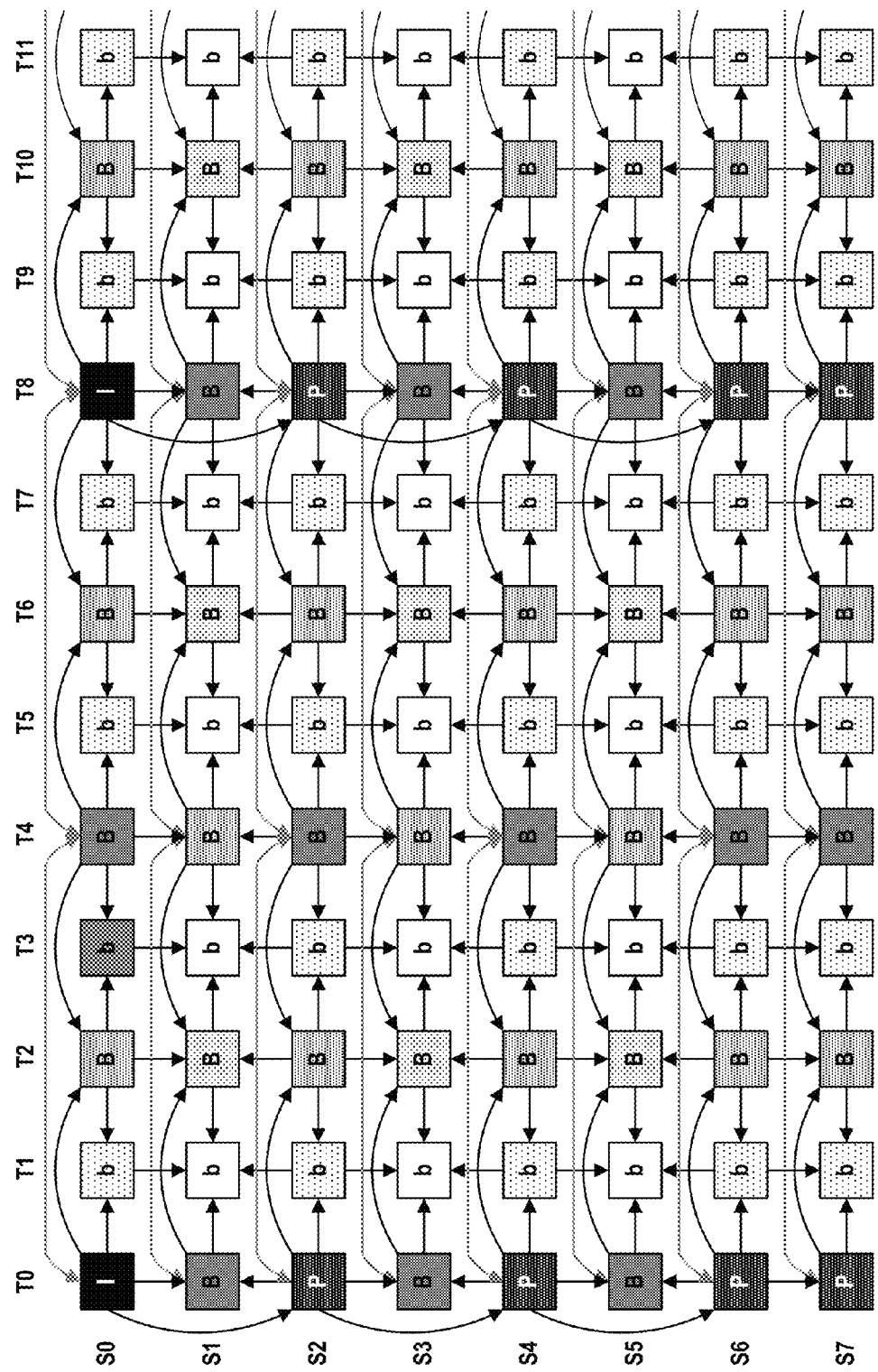
FIG. 3 is a conceptual diagram illustrating an example multiview video coding prediction pattern.

FIG. 3 is a conceptual diagram illustrating an example multiview video coding prediction pattern. For instance, a typical multiview video coding prediction (including both inter-picture prediction within each view, and inter-view prediction) structure for multi-view video coding is shown in FIG. 3, where predictions are indicated by arrows, the pointed-to object using the point-from object for prediction reference.

In MVC, the inter-view prediction is supported by disparity motion compensation, which uses the syntax of the H.264/AVC motion compensation, but allows a picture in a different view to be used as a reference picture. Other multiview video coding standards similarly allow for inter-view prediction. For instance, MV-HEVC and 3D-HEVC support disparity motion compensation using the syntax for HEVC.

Coding of two views could be supported also by multi-view video coding, and one of the advantages of multiview video coding is that video encoder 20 could take more than two views as a 3D video input and video decoder 30 can decode such a multiview representation. This is way a renderer with a multiview video coding decoder may process 3D video content with more than two views.

In multiview video coding, inter-view prediction is allowed among pictures in the same access unit (i.e., with the same time instance). When coding a picture in one of the non-base views, a picture may be added into a reference picture list, if it is in a different view but with a same time instance. An inter-view reference picture can be put in any position of a reference picture list, just like any inter-prediction reference picture. When an inter-view reference picture is used for motion compensation, the corresponding motion vector is referred to as a "Disparity Motion Vector."

In 3D-HEVC and MV-HEVC, to further improve the coding efficiency, two new technologies, namely, "inter-view motion prediction" and "inter-view residual prediction" have been adopted in the latest reference software. To enable these two coding tools, the first step is to derive a disparity vector. The disparity vector is used either to locate the corresponding block in the other view for inter-view motion/residual prediction or be converted to a disparity motion vector for inter-view motion prediction.

Inter-view motion prediction and inter-view residual prediction are some examples of video coding tools that utilize a disparity vector for a current block; however, there may be additional video coding tools that use a disparity vector, and the techniques described in this disclosure are not limited to these examples of video coding tools that utilize a disparity vector. Techniques to determine the disparity vector for a current block and example uses of the disparity vector such as in inter-view motion prediction and inter-view residual prediction are described in more detail below.

In general, a disparity vector indicates disparity between a current block and a corresponding block in another view. For example, the video content of the current block and the video content of the corresponding block in the other view may be similar, but the location of the blocks may be displaced relative to one another in respective pictures. The disparity vector provides a measure of this displacement.

A disparity vector and a disparity motion vector should not be confused, as these vectors are different. Both a disparity vector and a disparity motion vector refer to blocks in other views; however, the purpose and use of the disparity vector and the disparity motion vector is different. A disparity motion vector for a current block refers to a predictive block, where the residual between the predictive block and the current block is transformed, quantized, and signaled as part of the bitstream. A disparity vector, on the other hand, is used for various coding tools. For instance, unlike a disparity motion vector, which indicates the actual motion vector for the current block, the disparity vector refers to a reference block whose motion information may possibly be used to determine the motion vector for the current block. In other words, the block referred to by the disparity motion vector is the block whose pixel values are subtracted from the pixel values of the current block. In contrast, it is the motion information of the block referred to by the disparity vector that is then used to determine the motion vector for the current block.

The block referred to by the disparity vector may be used as a reference block for encoding or decoding the current block because the motion information of the reference block may be used to encode or decode the current block. Also, the video content of the block referred to by the disparity vector may be similar to that of the current block, and in this sense may be considered as a corresponding block to the current block. Accordingly, in this disclosure, the block referred to by the disparity vector may be referred to as a reference block or as a corresponding block.

It should be noted that in some cases, the disparity vector is converted to a disparity motion vector for the current block. However, this may only happen if the disparity vector is selected to be the disparity motion vector. In this way, the disparity vector is different than the disparity motion vector, except in the case where the disparity vector is specifically selected to be the disparity motion vector for the current block. Moreover, in some examples, in instances where the disparity vector is to be used as a disparity motion vector, a clipping function may be applied to the disparity vector, where the y-component of the disparity vector is set to zero, and the resulting vector is used as a disparity motion vector.

The techniques described in this disclosure are related to identifying the reference block (e.g., corresponding block) in a reference picture in a reference view based on the determined disparity vector. For example, which block the disparity vector identifies is based on where the disparity vector of the current block starts from. For instance, a disparity vector includes a start position that begins from a pixel and an end position that points to a pixel within a block. Video encoder 20 and video decoder 30 may identify the reference block for the current block as the block that includes (e.g., covers) the pixel to which the disparity vector points. The disparity vector for the current block would refer to different pixels for different start positions of the disparity vector. Therefore, based on the start position of the disparity vector, there may be different possible reference blocks in the reference picture in the reference view to which the disparity vector can point.

To identify the reference block based on the disparity vector, this disclosure describes example techniques for determining the end position to which the disparity vector refers. Because the end position to which the disparity vector refers is based on the start position of the disparity vector, the techniques may be considered as setting the start position of the disparity vector so that the disparity vector refers to the determined end position. In some examples, the start position of the disparity vector for the current block may be within the current block. In some examples, the start position of the disparity vector for the current block may be external to the current block.

It should be understood that the purpose of the disparity vector is to identify a reference block that is used for various video coding tools to inter-predict (including inter-view predict) the current block, such as inter-view motion prediction and inter-view residual prediction, as a few examples. The reference block that statistically tends to provide good coding efficiency for encoding or decoding the current block may happen to require the disparity vector for the current block to start from within the current block or start from external to the current block.

Figure 4:
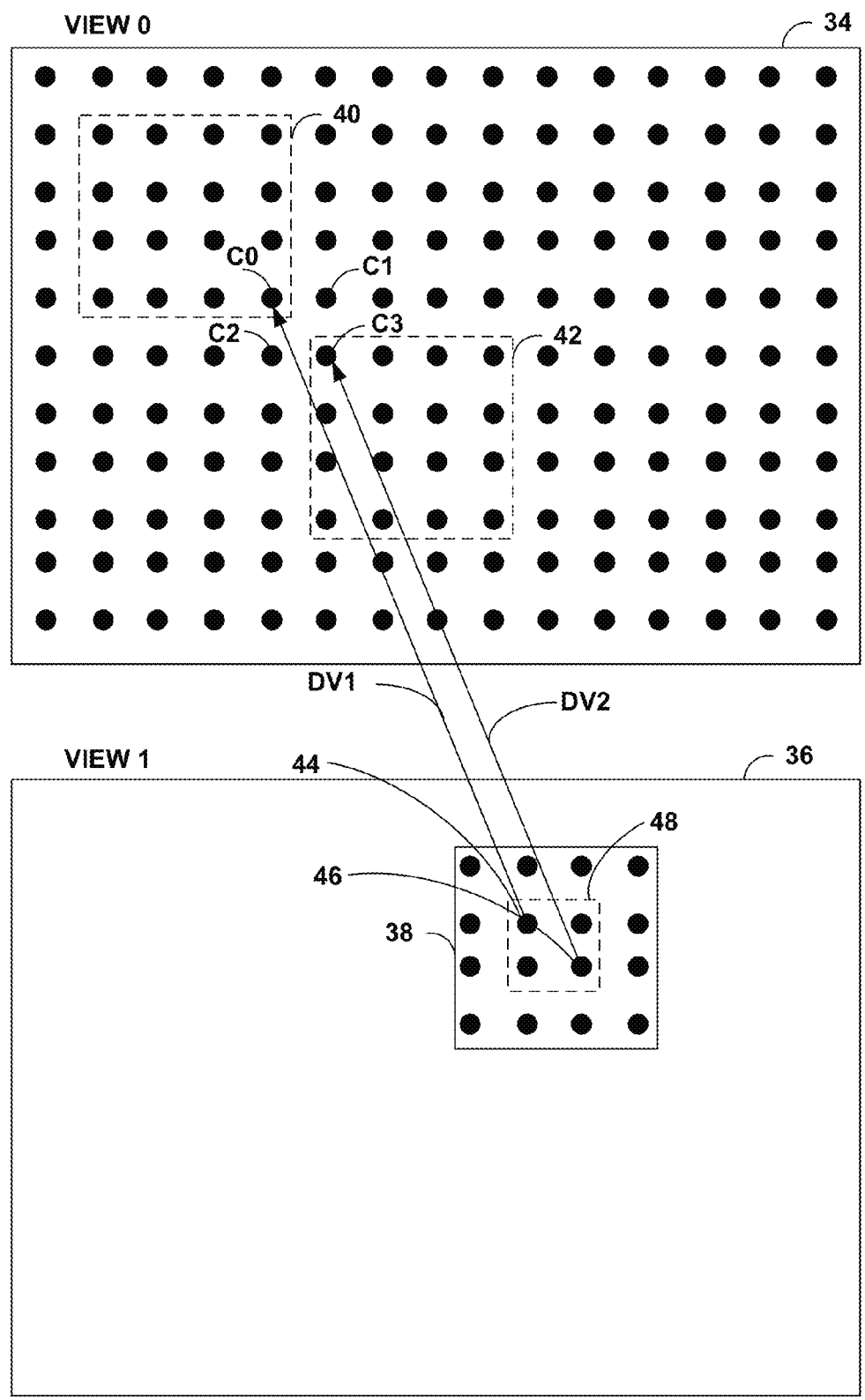
FIG. 4 is a conceptual diagram illustrating example starting positions for a disparity vector for identifying a reference block.

FIG. 4 is a conceptual diagram illustrating example starting positions for a disparity vector for identifying a reference block. As illustrated in FIG. 4, view 0 includes picture 34 and a different view, view 1 includes picture 36. Picture 34 and picture 36 may be displayed at approximately the same time, and hence, may be part of the same access unit.

In this example, picture 36 is the current picture in the current view (e.g., view 1), and picture 34 is the reference picture in the reference view (e.g., view 0). Picture 36 includes video block 38. Video block 38 is the video block that is being encoded or decoded. For example, from the perspective of video encoding, video block 38 is the current block being inter-prediction encoded by video encoder 20. From the perspective of video decoding, video block 38 is the current block being inter-prediction decoded by video decoder 30. In other words, the example illustrated in FIG. 4 is applicable to the situation where video encoder 20 is encoding the current block (e.g., video block 38), and applicable to the situation where video decoder 30 is decoding the current block (e.g., video block 38).

Because FIG. 4 illustrates an example applicable to both video encoder 20 and video decoder 30, to ease with description, the example of FIG. 4 is described with respect to a video coder. A video coder, as used in this disclosure, is a generic term for a processing unit configured to encode or decode video data. For instance, one example of a video coder is video encoder 20 and another example of a video coder is video decoder 30. Also, in this disclosure, the term code or coding is used to generically refer to encode or encoding, respectively, or decode or decoding, respectively. For example, a video coder coding or configured to code generically refers to video encoder 20 encoding or configured to encode or to video decoder 30 decoding or configured to decode.

In the example illustrated in FIG. 4, a video coder (e.g., video encoder 20 or video decoder 30) may have determined a disparity vector (DV) for video block 38. For instance, the video coder may have utilized neighboring block based disparity vector (NBDV) derivation techniques (and possibly in combination with refinement techniques) to derive the disparity vector for video block 38. The NBDV derivation technique and refinements for determining the disparity vector for video block 38 are described in more detail below. However, the techniques described in this disclosure are applicable to other ways in which to determine or derive the disparity vector for video block 38.

The video coder may have also determined that the disparity vector for video block 38 refers to a reference block in picture 34. For example, the syntax element refViewIdx may define an index value of the reference picture, the video coder may determine the value of ViewIdx based on the refViewIdx. In this example, the value of ViewIdx is equal to 0 to indicate view 0. The video coder may identify the reference block based on a location (e.g., a pixel in picture 34) to which the disparity vector for video block 38 refers. However, the location in picture 34 to which the disparity vector for video block 38 refers is based on a start position of the disparity vector.

For instance, the location (e.g., coordinates of pixel in picture 34) where the disparity vector refers may be calculated based on the x- and y-components of the disparity vector and coordinates of a start position of the disparity vector. As one example, the video coder may add the x-coordinate of the start position with the x-component of the disparity vector to determine the x-coordinate of the location in picture 34 to which the disparity vector refers, and add the y-coordinate of the start position with the y-component of the disparity vector to determine the y-coordinate of the location in picture 34.

In some examples, the video coder may shift or round the coordinates of the disparity vector to align the disparity vector to refer to integer precision. For example, without the shifting or rounding, the disparity vector may not refer to a pixel, but may point to a location between pixels (i.e., sub-pixel precision such as quarter-pixel precision). With shifting and/or rounding of the disparity vector, the video coder may ensure that the disparity vector refers to a pixel (i.e., integer precision).

In some examples, the video coder may determine the block (e.g., prediction unit) that covers the location where the disparity vector refers. The video coder may identify the determined block as the reference block that is used for various video coding tools that rely on the disparity vector such as inter-view motion prediction, inter-view residual prediction, or examples where the disparity vector is converted to a disparity motion vector as a few non-limiting examples of video coding tools that rely on the disparity vector.

FIG. 4 illustrates disparity vectors DV1 and DV2. The values of disparity vectors DV1 and DV2 is the same (i.e., the x-component and the y-component for DV1 and DV2 are the same), but are illustrated separately because the start position of DV1 is different from the start position of DV2, and therefore, the location to which DV1 and DV2 respectively refer are different. For example, the video coder may have determined the value of the disparity vector for video block 38, and the value of the disparity vector is the same value for DV1 as well as DV2.

In FIG. 4, the start position of disparity vector DV1 is position 44 within video block 38, and the start position of disparity vector DV2 is position 46 within video block 38. The location to which disparity vector DV1 refers is location C0 in reference picture 34 of reference view 0, and the location to which disparity vector DV2 refers is location C3 in reference picture 34 of reference view 0.

For example, video block 38 is illustrated as a 4×4 block, but may be of other sizes as well, such as 8×8, 8×4, 4×8, 16×16, 16×8, or 8×16, as a few examples. For blocks of such sizes, there may not be a single center pixel in the middle of the block. Rather, there are four candidate "center" pixels within the block that form a 2×2 sub-block.

As illustrated in FIG. 4, the center of video block 38 is represented by center 2×2 sub-block 48. If video block 38 were of a different size than 4×4, there would similarly be a center 2×2 sub-block. In FIG. 4, position 44 is the position of the top-left pixel of center 2×2 sub-block 48, and position 46 is the position of the bottom-right pixel of center 2×2 sub-block 48. The x-coordinate of the top-left pixel of center 2×2 sub-block 48 may be calculated by dividing the width of video block 38 by two and adding the resulting value to the x-coordinate of the top-left pixel of video block 38, and subtracting one from the resulting value. The y-coordinate of the top-left pixel of center 2×2 sub-block 48 may be calculated by dividing the length of video block 38 by two and adding the resulting value to the y-coordinate of the top-left pixel of video block 38, and subtracting one from the resulting value.

The coordinates of the top-right pixel of 2×2 sub-block 48 may be calculated by adding one to the x-coordinate of the top-left pixel of 2×2 sub-block 48 and keeping the y-coordinate the same. The coordinates of the bottom-left pixel of 2×2 sub-block 48 may be calculated by adding one to the y-coordinate of the top-left pixel of 2×2 sub-block 48 and keeping the x-coordinate the same. The coordinates of the bottom-right pixel of 2×2 sub-block 48 may be calculated by adding one to the x-coordinate of the top-left pixel of 2×2 sub-block 48 and adding one to the y-coordinate of the top-left pixel of 2×2 sub-block 48.

As an example, assume that the top-left pixel of video block 38 is located at (5, 6), and as illustrated video block 38 is a 4×4 block. In this example, the x-coordinate of the top-left pixel of center 2×2 sub-block 48 is 5+4/2−1, which equals 6. The y-coordinate of the top-left pixel of center 2×2 sub-block 48 is 6+4/2−1, which equals 7. In other words, the coordinates of position 44 is (6, 7). The x-coordinate of the bottom-right pixel of center 2×2 sub-block 48 is 6+1, which is 7, and the y-coordinate of the bottom-right pixel of center 2×2 sub-block 48 is 7+1, which 8. In other words, the coordinates of position 46 is (7, 8).

As illustrated, if the disparity vector for video block 38 starts from position 44 (e.g., from the top-left pixel of center 2×2 sub-block 48), then the disparity vector refers to the pixel at location C0, as illustrated by disparity vector DV1. If the disparity vector for video block 38 starts from position 46 (e.g., from the bottom-right pixel of center 2×2 sub-block 48), then the disparity vector refers to the pixel at location C3, as illustrated by disparity vector DV2.

In some examples, the video coder may determine location C0 in reference picture 34 of the reference view 0 and determine the block that covers location C0. As illustrated, the block that covers location C0 in FIG. 4 is block 40. The video coder may identify block 40 as the reference block (e.g., corresponding block) for video block 38, and utilize block 40 for one or more video coding tools that rely on the disparity for video block 38. As one example, in inter-view motion prediction, the video coder may utilize the motion information associated with block 40 for coding video block 38.

As another example of utilizing block 40 for coding video block 38, block 40 may function as a predictive block for video block 38. In other words, the video coder may determine a residual between pixel values of block 40 and video block 38. In these examples, the disparity vector may be considered as a disparity motion vector for video block 38. Also, in these examples, the video coder may store a reconstructed version of block 40 that the video coder stores for inter-prediction purposes. In other words, when block 40 is a predictive block, a reconstructed version of block 40 functions as the predictive block.

In this sense, in some examples, the video coder may utilize the motion information of block 40 for coding video block 38. In some examples, the video coder may utilize a reconstructed block 40 for coding video block 38. In either of these examples, the video coder utilizes block 40 for inter-prediction coding video block 38.

The technique for determining location C0 based on the disparity vector for video block 38 is as follows. Denote a luma location (xP, yP) of the top-left luma sample of the current prediction unit (e.g., video block 38) relative to the top-left luma sample of the current picture (e.g., picture 36). The values nPSW and nPSH denote the width and height of the current prediction unit (e.g., video block 38), respectively. Given reference view order index refViewIdx, and a disparity vector mvDisp, the reference layer luma location (xRef, yRef) is derived by:

$$xRef=Clip3(0, PicWidthInSamples_L-1, xP+((nPSW-1)\gg1)+((mvDisp[0]+2)\gg2)) \quad \text{(H-124)}$$

$$yRef=Clip3(0, PicHeightInSamples_L-1, yP+((nPSH-1)\gg1)+((mvDisp[1]+2)\gg2)) \quad \text{(H-125)}$$

In the above equations, mvDisp[0] equals the x-component of the disparity vector, mvDisp[1] equals the y-component of the disparity vector, and PicWidthInSamples$_L$ and PicHeightInSamples$_L$ define the resolution of the picture in the reference view (same as the current view). In the above equations, xP+((nPSW−1)>>1) and yP+((nPSH−1)>>1) together equal the start position of the disparity vector (i.e., xP+((nPSW−1)>>1) is the x-coordinate of position 44 and yP+((nPSH−1)>>1 is the y-coordinate of position 44). In the above equations, xRef is the x-coordinate for the location within picture 34 to which the disparity vector points (e.g., the x-coordinate for location C0), and yRef is the y-coordinate for the location within picture 34 to which the disparity vector points (e.g., the y-component for location C0). In the above equation, Clip3 is a clipping function described in the more detail below.

In this way, the above equations define the way to determine the end point of disparity vector DV1. In other words, the video coder may set the start position of the disparity vector equal to the coordinates of position 44, and determine the coordinates of location C0 by adding respective coordinates of the start position to the value of the disparity vector (e.g., add x-coordinate of position 44 with x-component of disparity vector, and y-coordinate of position 44 with y-component of disparity vector).

The video coder may identify the reference block (e.g., the corresponding block) as the video block that covers the xRef, yRef coordinates within picture 34 (e.g., that covers location C0 within picture 34). In the example illustrated in FIG. 4, block 40 of reference picture 34 covers location C0. In other words, the corresponding block is set to the prediction unit that covers the luma location (xRef, yRef) in the view component with ViewIdx equal to refViewIdx. In this example, refViewIdx is the index value used to identify the reference view that includes the reference picture, and ViewIdx is equal to view 0.

However, there may be blocks other than block 40 that statistically tend to provide better video coding efficiency for video coding tools that rely on the disparity vector. Accordingly, in the techniques described in this disclosure, the video coder may identify the reference block for video block 38 as a block other than the block that covers location C0 in reference picture 34.

As one example, the block that covers the pixel located to the bottom-right of the pixel located at location C0 may tend to statistically provide better video coding efficiency than the block that covers the pixel located at location C0. In FIG. 4, the location of the pixel that is located to the bottom-right of location C0 (e.g., at location (1, 1) relative to location C0) is referred to as location C3, and block 42 covers location C3.

To determine the location of location C3 in reference picture 34, the video coder may set the start position of the disparity vector to a different position than the position used to determine location C0 (e.g., different than position 44). For example, the video coder may set the start position of the disparity vector equal to the coordinates of position 46. The reasoning for changing the start position of the disparity vector is because the value of the disparity vector remains the same, but a different end position of the disparity vector is needed (e.g., location C3, rather than location C0). To change the end position of the disparity vector, only the start position may change because the value of the disparity vector is the same.

It should be noted that it may be possible to change the value of the disparity vector, rather than the start position, so that the end position of the disparity vector is location C3, instead of location C0. However, for purposes of description, the disclosure is described with respect to changing the start position of the disparity vector, rather than the value of the disparity vector, so that the disparity vector refers to location C3 rather than location C0.

For the example where the start position of the disparity vectors changes so that the disparity vector refers to location C3, the x-coordinate for the start position (e.g., position 46 in FIG. 4) is xP+((nPSW)>>1) and the y-coordinate for the start position (e.g., position 46 in FIG. 4) is yP+((nPSH)>>1). The equation to determine the location of location C3 is as follows.

$$xRef=Clip3(0, PicWidthInSamples_L-1, xP+ (nPSW>>1)+((mvDisp[0]+2)>>2)) \quad \text{(H-124)}$$

$$yRef=Clip3(0, PicHeightInSamples_L-1, yP+ (nPSH>>1)+((mvDisp[1]+2)>>2)) \quad \text{(H-125)}$$

In the equations immediately above, xRef is the x-coordinate for the location within picture 34 to which the disparity vector points (e.g., the x-coordinate for location C3), and yRef is the y-coordinate for the location within picture 34 to which the disparity vector points (e.g., the y-component for location C3). In the above equations, xP+(nPSW>>1) and yP+(nPSH>>1) together equal the start position of the disparity vector (i.e., xP+(nPSW>>1) is the x-coordinate of position 46 and yP+(nPSH>>1 is the y-coordinate of position 46). In other words, in the above equations, coordinates of the bottom-right pixel in the center 2×2 sub-block 48 within the current block 38 equal ((xP+(nPSW>>1)), (yP+(nPSH>>1))), where yP equals a y-coordinate of a top-left corner of current block 38, where xP equals an x-coordinate of a top-left corner of current block 38, where nPSW equals a width of current block 38, and where nPSH equals a height of current block 38.

In this way, the above equations define the way to determine the end point of disparity vector DV2. For example, the video coder may set the start position of the disparity vector equal to the coordinates of position 46, and determine the coordinates of location C3 by adding respective coordinates of the start position to the value of the disparity vector (e.g., add x-coordinate of position 46 with x-component of disparity vector, and y-coordinate of position 46 with y-component of disparity vector). For instance, the video coder may determine an x-coordinate and y-coordinate for the location in reference picture 34 to which disparity vector DV2 refers based on the disparity vector starting from a bottom-right pixel in center 2×2 sub-block 48 within current video block 38.

In the above equations, the video coder may apply a clipping operation to determine xRef and yRef. Such clipping may not be necessary in every example. The equations for xRef and yRef without the clipping function may be as follows.

$$xRef=xP+((nPSW)>>1)+((mvDisp[0]+2)>>2)),$$

$$yRef=yP+((nPSH)>>1)+((mvDisp[1]+2)>>2)).$$

In the techniques described in this disclosure, the video coder may determine a block in a reference picture in a reference view based on a location in the reference picture to which the disparity vector refers when the disparity vector starts from a bottom-right pixel in a center 2×2 sub-block within the current block (e.g., based on the disparity vector starting from a bottom-right pixel in a center 2×2 sub-block within the current block). For instance, as illustrated in FIG. 4, the video coder may determine a 4×4 block (e.g., block 42) that covers location C3 in reference picture 34 to which the disparity vector DV2 refers based on the disparity vector starting from position 46 (e.g., when the disparity vector starts from position 46). The video coder may determine the x- and y-coordinates of location C3 to which the disparity vector refers using the equations for xRef and yRef provides above, and determine the block that covers the determined x- and y-coordinates.

It is the motion information of block 42 or the pixel values of block 42 that the video coder may then use to inter-prediction code (e.g., encode or decode) current block 38 using video coding tools that rely on the disparity vector. As one example, the video coder may insert the motion information of block 42 is a list of candidate motion vector predictors. If the motion information of block 42 is selected from the same list of candidate motion vector predictors as the motion information that the video coder is to use for predicting the motion vector for current block 38, then the video coder may inter-prediction code the current block based on the motion information of the determined block.

As another example, the video coder may utilize block 42 as a predictive block. For example, the video coder stores a reconstructed version of block 42. For instance, during video encoding, video encoder 20 includes a feedback path in which video encoder 20 reconstructs encoded blocks, and stores the reconstructed blocks in memory so that block 42 can be used for encoding subsequent blocks. During video decoding, video decoder 30 reconstructs block 42 and stores reconstructed block 42 in memory so that block 42 can be used for decoding subsequent blocks. In some cases, the video coder determines a difference between the pixel values of video block 38 and block 42, such as in examples where block 42 functions as a predictive block for video block 38. In examples where a reconstruction of block 42 functions as a predictive block, the disparity vector may be considered as a disparity motion vector for video block 38.

In other words, the video coder may inter-prediction code the current block based on the determined block. As one example, the video coder may inter-prediction code the current block based on the motion information of the determined block if the determined block is to be used for inter-prediction coding the current block. As another example, the video coder inter-predict code the current block based on pixel values of a reconstruction of the determined block.

In some cases, the xRef and yRef may be cropped to ensure that the block referred to by the disparity vector is still within the reference picture 34. Also, when the disparity vector is with ¼-pixel accuracy, the shifting operations (mvDisp[i]+2)>>2) may be replaced with mvDisp[i], where i equals 0 or 1.

In this example, the video coder may identify the reference block (e.g., the corresponding block) as the video block that covers the xRef, yRef coordinates within picture 34 (e.g., that covers location C3 within picture 34). In the example illustrated in FIG. 4, block 42 of reference picture 34 covers location C3. In other words, the corresponding block is set to the prediction unit that covers the luma location (xRef, yRef) in the view component with ViewIdx equal to refViewIdx. In this example, refViewIdx is the index value used to identify the reference view that includes the reference picture, and ViewIdx is equal to view 0.

As can be seen from FIG. 4, the location to which the disparity vector refers affects which block the video coder identifies as the reference block, and the location to which the disparity vector refers is based on the start position of the disparity vector. Therefore, the start position of the disparity vector affects which block in reference picture 34 is identified as the reference block (e.g., block 40 or block 42).

The motion information of block 42 or the pixel values of a reconstruction of block 42 may statistically tend to provide better video coding efficiencies for video coding tools that rely on the disparity vector than the motion information of block 40 or the pixel values of a reconstruction of block 40. Accordingly, in some examples, the video coder may identify the block that covers location C3 (e.g., block 42) as the reference block for the current block (e.g., video block 38).

In some examples, rather than identifying the block that covers location C3 in reference picture 34 of reference view 0 as the reference block for video block 38, the video coder may identify the block that covers location C1 or location C2 in reference picture 34 of reference view 0 as the reference block for video block 38. For instance, FIG. 4 illustrates a pixel located at location C1 that is to the right of the pixel located at C0 (e.g., at location (1, 0) relative to location C0), and a pixel located at location C2 that is below the pixel located at C0 (e.g., at location (0, 1) relative to location C0). In this case, the pixel located at location C3 is located (1, 1) relative to location C0.

The video coder may implement similar techniques as those described above to determine location of location C1 or location C2 in reference picture 34. For instance, the video coder may change the start position of the disparity vector so that the disparity vector refers to location C1 (i.e., the start position is the top-right pixel in 2×2 center sub-block 48) or location C2 (i.e., the start position is the bottom-left pixel in 2×2 center sub-block 48). The video coder may then identify the block that covers location C1 or C2 as the reference block for the current block (e.g., for video block 38).

In some examples, the video coder may check multiple blocks that cover different locations in reference picture 34 to identify the reference block for video block 38. For example, the video coder may first determine the block that covers location C3 (e.g., block 42). The video coder may then determine whether the motion information of block 42 is available for one or more video coding tools that rely on the disparity vector.

For instance, if block 42 is intra-prediction coded, then there is no motion information for block 42. In another example, if block 42 is inter-view prediction coded, then the motion information of block 42 may not be usable for coding current video block 38 using one or more video coding tools that rely on the disparity vector. Also, in another example, if block 42 is inter-predicted, but the picture in current view which is located in the same access unit as the reference picture to which the motion vector of block 42 refers is not identified in the reference picture list(s) of video block 38, then the motion information of block 42 may not be usable for coding current video block 38 using one or more video coding tools that rely on the disparity vector.

If the video coder determines that the motion information for block 42 is available for the one or more video coding tools that rely on the disparity vector, then the video coder may identify block 42 as the reference block for video block 38. If video coder determines that the motion information for block 42 is not available for the one or more video coding tools that rely on the disparity vector, the video coder may determine that no reference block is available for video block 38. In some examples, rather than determining that there is no reference block for video block 38, the video coder may determine the block that covers location C0 (e.g., block 40), and determine whether the motion information for block 40 is available for the one or more video coding tools that rely on the disparity vector. If the video coder determines that the motion information for block 40 is available for the one or more video coding tools that rely on the disparity vector, the video coder may determine that block 40 is the reference block for current video block 38. Otherwise, the video coder may determine that no reference block is available for video block 38.

In some examples, the video coder may perform the opposite steps. For instance, the video coder may first determine if the motion information of block 40 is available for the one or more video coding tools that rely on the disparity vector, and determine that block 40 is the reference block for video block 38 if the motion information is available. If the motion information is not available, then the video coder may determine whether the motion information for block 42 is available, and if so determine that block 42 is the reference block for current video block 38. If the motion information for block 42 is not available, then the video coder may determine that no reference block for video block 38 exists.

The video coder need not necessarily truncate the checking for the reference block after two blocks (e.g., after blocks 40 and 42, in either order). In some examples, the video coder may check blocks 40 and 42 (in either order), and if neither block is available for video coding tools that rely on the disparity vector, the video coder may determine the block that covers location C1 or block that covers location C2 (in either order) and determine whether either of these blocks is available. In general, the various permutations of the orders of checking blocks that cover locations C0, C1, C2, and C3 are possible, and contemplated by this disclosure.

The above examples described identifying a reference block based on the block that covers the location to which the disparity vector refers (e.g., points). However, the techniques described in this disclosure are not so limited. In some examples, the video coder may determine the location of a block based on the disparity vector, and determine whether the block is the reference block for video block 38.

As one example, the video coder may identify the "bottom-right" block in reference picture 34, referred to as BR0. For instance, if the disparity vector of the current video block 38 started from the block that is to the bottom-right of current video block 38, the location to which the disparity vector points in reference picture 34 is the top-left corner of the BR0 block. In this example, the start position of the disparity vector for video block 38 is external to video block 38. The x-coordinate for the BR0 block is xP+(nPSW−1)+((mvDisp[0]+2)>>2), and the y-coordinate for the BR0 block is yP+(nPSH−1)+((mvDisp[1]+2)>>2). Also, in this example, the x-coordinate for the start position for the disparity vector is xP+(nPSW−1), and the y-coordinate for the start position for the disparity vector is yP+(nPSH−1). The start position for the disparity vector that refers to block BR0 is different than the start position of the disparity vector that refers to block 40 or block 42, and may be external to video block 38.

In some examples, rather than checking blocks 42, 40, or the blocks that cover locations C1 and C2, the video coder may determine whether the motion information for block BR0 is available for the video coding tools that rely on the disparity vector. If available, the video coder may identify block BR0 as the reference block, and otherwise determine that no reference block exists. However, in some examples, there may be other blocks to check as well. These other blocks of reference picture 34 are labelled as block BR1 and block BR2. Block BR1 is located (1, 1) relative to block BR0, and block BR2 is located (2, 2) relative to block BR0. The video coder may similarly determine the location of blocks BR1 and BR2 as determined for block BR0 (e.g., by changing the start position of the disparity vector such that the disparity vector refers to block BR1 or block BR2).

As additional example ways to identify the reference block, the video coder may first shift and quantize the left-top corner position of the block referred to by the disparity vector if the disparity vector starts from the top-left corner of video block 38. For example, the video coder may implement the following equation: ((xP+(mvDisp[0]+2)>>2)+2)>>2, (yP+(mvDisp[1]+2)>>2)+2)>>2). After that, the video coder may directly apply a shift of (nPSW/2, nPSH/2), (nPSW, nPSH) to identify a 4×4 block. Other potential blocks may be based on a shift of (nPSW/2-4, nPSH/2-4), (nPSW/2+4, nPSH/2+4), (nPSW-4, nPSH-4), and (nPSW+4, nPSH+4). After a shift is applied, the video coder may identify as the reference block a 4×4 block using the shifted sample position as the top-left position.

It should be understood that in the techniques described above various permutations are possible. For instance, one checking order may include the block that covers location C3, then the block that covers location C0, then the block that covers location C1, then the block that covers C2, then the BR0 block, then the BR1 block, then the BR2 block, and then applying the shifting technique to identify the reference block, and truncating the search for the reference block if none of the blocks include motion information available for the one or more video coding tools. However, the techniques are not so limited. Other checking orders may be possible, and contemplated by this disclosure.

Moreover, the video coder need not necessarily check all of the possible blocks, and may check only a subset of the blocks (e.g., only one block, or only two blocks, and so forth). For instance, the video coder may start with block 42, and if block 42 is not available, determine that no reference block for video block 38 is available. In some examples, more coding gains may be realized by checking only block 42, and truncating if block 42 is not available. The reason may be that checking additional blocks requires additional memory bandwidth, and even if there are any video coding gains in identifying a block whose motion information can be used as the reference block if motion information for block 42 is unavailable, the cost of the additional memory requests may outweigh the benefit.

Video encoder 20 and video decoder 30 may be configured to implicitly perform one or a combination of two or more of the example techniques described above so that video encoder 20 and video decoder 30 identify the same block as the reference block for video block 38. For instance, video encoder 20 may not need to signal information indicating which block is the reference block in reference picture 34, and video decoder 30 may not need to receive information indicating which block is the reference block in reference picture 34.

However, in some examples, video encoder 20 may check various blocks and determine which block provides the most coding gains if identified as the reference block. For example, video encoder 20 may not stop checking blocks after determining that one of the blocks of reference picture 34 includes motion information available for one or more video coding tools that rely on the disparity vector, and may determine a plurality of blocks that include motion information available for one or more video coding tools that rely on the disparity vector. Video encoder 20 may then determine which of these blocks provides the most coding gains, and signal information indicating which block is the reference block. Video decoder 30 may receive the information indicating which block is the reference block, and identify the reference block based on the received information.

Furthermore, although the techniques have been described with respect to a disparity vector, the techniques are not so limited. For example, the techniques may be generalized to any scenario when identifying a syntax element or variable associated with a block is needed.

In accordance with this disclosure, for video coding tools that rely on a disparity vector, such as inter-view motion prediction, no matter for texture or depth (described in more detail below), the video coder may need to identify a block in a reference view by firstly identifying a pixel. Some existing techniques may not be accurate enough.

To address these issues, the techniques described in this disclosure may be summarized as follows. For instance, this disclosure describes techniques to identify different pixels during the identification of a reference block in the reference view. The techniques may be applicable to inter-view motion prediction for a texture view or a depth view, or generally to various video coding tools that rely on a disparity vector.

In the techniques described in this disclosure, denote (xP, yP) be the top-left corner position of the current PU and a disparity vector mvDisp (with ¼-pel accuracy) for the current PU. Denote the center sample identified by this disparity vector as C0, with a relative coordination of (xP+((nPSW−1)>>1)+((mvDisp[0]+2)>>2), yP+((nPSH−1)>>1)+((mvDisp[1]+2)>>2)). Denote the other three pixels adjacent to C0 as C1, C2, C3 with a relative position to C0 as (1, 0), (0, 1) and (1, 1). Denote the bottom-right sample with a coordination of (xP+(nPSW−1)+((mvDisp[0]+2)>>2), yP+(nPSH−1)+((mvDisp[1]+2)>>2)) as BR0. BR1 and BR2 are two samples with relative position to BR0 as (1, 1) and (2, 2).

Note that for any of the above samples, the horizontal and vertical component can be cropped to make sure the sample is still within a picture. Note when the disparity vector is with integer accuracy, the shifting operations ((mvDisp[i]+2)>>2) could be simply replaced by mvDisp[i].

In one example, instead of identifying the block by identifying the C0 pixel, the C3 pixel is utilized and the block is identified as the 4×4 block/prediction unit covering the C3 pixel. The C3 position is calculated as follows.

$$x\text{Ref}=\text{Clip3}(0, \text{PicWidthInSamples}_L-1, xP+ ((nPSW)>>1)+((mv\text{Disp}[0]+2)-2)) \quad \text{(H-124)}$$

$$y\text{Ref}=\text{Clip3}(0, \text{PicHeightInSamples}_L-1, yP+ ((nPSH)>>1)+((mv\text{Disp}[1]+2)-2)) \quad \text{(H-125)}$$

where xRef represent the x-coordinate and yRef represent the y-coordinate of a location in the reference picture, and the block that covers this location is the reference block.

In some examples, C1 or C2 may be used. In some examples, BR0, BR1 or BR2 may be used. In some examples, C0 is firstly used, in addition, when the block 0 covering C0 does not produce an available merge candidate, the block 3 covering C3, if it is different from block 0, is used to produce an available merge candidate (described in more detail below). In some examples, C3 is firstly used. In addition, when the block 3 covering C3 does not produce an available merge candidate, the block 0 covering C0, if it is different from block 0, is used to produce an available merge candidate.

In some examples, BR0, BR1 or BR2 is used to identify a 4×4 block covering the BR0, namely block B0, a 4×4 block covering the BR1, namely block B1, and 4×4 block covering BR2, namely block B2, from which a merge candidate can be derived. In some examples, when merge candidate from block 0 or block 3, or from either block 0 or block 3 is unavailable, more merge candidate from one or more blocks of block B0, block B1 and block B2 are used.

In some examples, the left-top corner position is first shifted and quantized to be 4×4 aligned for instance as follows: calculate ((xP+(mvDisp[0]+2)>>2)+2)>>2, (yP+(mvDisp[1]+2)>>2)+2)>>2); after that a shift of (nPSW/2, nPSH/2), (nPSW, nPSH) may directly apply to identify a 4×4 block. Other potential blocks may be based on a shift of (nPSW/2-4, nPSH/2-4), (nPSW/2+4, nPSH/2+4), (nPSW-4, nPSH−4), and (nPSW+4, nPSH+4). After a shift is applied, a 4×4 block using the shifted sample position as the top-left position is identified.

As described above, the techniques described in this disclosure are related to video coding standards such as 3D-HEVC. The following provides some context for HEVC.

Reference picture lists are utilized to identify which pictures can be reference pictures for the current picture. For example, the reference picture lists each include a plurality of entries that are addressable by their index and that identify a reference picture. The video coder may construct one reference picture list for a P-picture and two reference picture lists for a B-picture. The reference picture lists are identified as RefPicList0 and RefPicList1. Reference picture list construction includes a reference picture list initialization step and reference picture list reordering (modification) step.

The reference picture list initialization is an explicit mechanism in which the video coder puts reference pictures stored in the reference picture memory (also known as decoded picture buffer) into a reference picture list based on the order of POC (Picture Order Count, aligned with display order of a picture) values. For reference picture list reordering, the video coder can modify the position of a picture in the list during the reference picture list initialization to any new position, or put any reference picture stored in the reference picture memory in any position. This includes pictures that did not belong to the initialized list. In some examples, after reference picture list reordering (modification), the video coder places some pictures in a farther position in the list. However, if a position of a picture exceeds the number of active reference pictures of the list, the picture is not considered as an entry of the final reference picture list. The number of active reference pictures may be signaled in the slice header for each list. After reference picture lists are constructed (namely RefPicList0 and RefPicList1 if available), the video coder identifies a reference picture included in the reference picture list based on a reference index into a reference picture list.

As described above, a motion vector identifies a block in a reference picture. In some examples, rather than coding motion vector itself, the video coder may utilize motion vector predictors to derive the motion vector. One example of a motion vector predictor is a temporal motion vector predictor. To determine a Temporal Motion Vector Predictor (TMVP), the video coder identifies a co-located picture. If the current picture is a B slice, a collocated_from_l0_flag is signaled in a slice header by video encoder 20 for reception by video decoder 30 to indicate whether the co-located picture is from RefPicList0 or RefPicList1. For instance, a value of 0 for the collocated_from_l0_flag indicates that the co-located picture is identified in RefPicList1 and a value of 1 for the collocated_from_l0_flag indicates that the co-located picture is identified in RefPicList0.

After the video coder identifies a reference picture list, the video coder uses the collocated_ref_idx, signaled in a slice header, to identify the picture in the identified reference picture list. The video coder identifies a co-located prediction unit (PU) in the co-located picture. Examples of the co-located prediction unit include a PU located to the bottom-right to a CU in the co-located picture relative to where the current block is located in the current picture or a center block in the CU in the co-located picture relative to where the current block is located. The TMVP may be one of the motion information of the bottom-right PU or center PU.

In some examples, the TMVP is one of the motion vector predictors that the video coder identifies in a list of candidate motion vector predictors used for advanced motion vector prediction (AMVP) or merge/skip mode, both of which are described in more detail. Additional examples of the motion vector predictors include motion vectors of spatially neighboring blocks referred to as spatial motion vector predictors (SMVPs). In accordance with the techniques described in this disclosure, the motion vector of the reference block identified by the disparity vector may also form one of the motion vector predictors, and in some examples, the disparity vector itself may form one of the motion vector predictors.

When the video coder uses motion vectors identified by the above process to generate a motion candidate for AMVP or merge mode, the video coder may scale the motion vectors based on the temporal location (reflected by POC). In some examples, the video coder may be preconfigured to set the reference index for the TMPV equal to zero for merge mode, and for AMVP mode, the video coder may set the reference index equal to the signaled reference index.

In HEVC, the SPS includes a flag sps_temporal_mvp_enable_flag and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

The following describes merge mode and AMVP mode. Techniques for using a disparity vector as part of merge mode and AMVP mode are described in more detail further below.

In merge mode and AMVP mode, the video coder (e.g., video encoder 20 or video decoder 30) constructs a list of candidate motion vector predictors. The list of candidate motion vector predictors include motion vectors for neighboring blocks, such as spatially or temporally neighboring blocks. Video encoder 20 signals an index into the list of candidate motion vector predictors, and video decoder 30 determines the motion vector predictor based on index.

In merge mode, the video coder inherits all of the motion information for the motion vector predictor (e.g., the reference picture and the motion vector value) as the motion information for the current block. In AMVP mode, video encoder 20 signals a motion vector difference (MVD) between the actual motion vector for the current block and the motion vector predictor. Video decoder 30 determines the actual motion vector for the current block by adding the MVD with the motion vector predictor. In addition, video encoder 20 signals information used to identify the reference picture(s) (e.g., an index value into one or both of RefPicList0 and RefPicList1), and video decoder 30 determines the reference picture(s) based on received information used to identify the reference picture(s).

In some examples, in addition to motion vectors of neighboring blocks, motion vectors determined from the disparity vector of the current block, as well as the disparity vector, can be added to the list of candidate motion vector predictors for merge mode and AMVP mode. The techniques for determining the motion vector from the disparity vector and techniques for determining the disparity vector are described further below.

The following describes techniques for disparity vector derivation (e.g., the disparity vector derivation process). To derive a disparity vector, the method called Neighboring Blocks based Disparity Vector (NBDV) derivation technique is used in the current 3D-HTM by video encoder 20 and video decoder 30. For example, the video coder utilizes disparity motion vectors from spatial and temporal neighboring blocks to derive the disparity vector in accordance with the NBDV derivation technique. In the NBDV derivation technique, the video coder checks the motion vectors of spatial or temporal neighboring blocks in a fixed checking order. After the video coder identifies a disparity motion vector or an implicit disparity vector (IDV) (implicit disparity vector is described in more detail below), the video coder terminate the checking process and the identified disparity motion vector is returned, and the video coder converts the identified disparity motion vector to the disparity vector. The video coder uses the disparity vector as the inter-view motion prediction and inter-view residue prediction.

In some examples, it may be possible that the video coder does not identify a disparity motion vector from a neighboring block or an IDV after checking all the predefined neighboring blocks. In such examples, if the video coder does not identify a disparity motion vector or an IDV, the video coder determines a zero disparity vector for the current block. The video coder uses a zero disparity vector for various video coding tools such as inter-view motion prediction. However, if the video coder does not identify a disparity motion vector or an IDV, inter-view residual prediction is not available for the current block.

As described above, the video coder checks spatial and temporal neighboring blocks to identify a disparity motion vector as part of the NBDV derivation technique. For spatial neighboring blocks, the video coder checks five spatial neighboring block, examples of which include the below-left, left, above-right, above and above-left blocks of a current block (e.g., current prediction unit (PU)), denoted by A0, A1, B0, B1 or B2, as defined in FIG. 8-3 of the HEVC specification. The temporal neighboring blocks that the video coder checks are described in more detail with respect to FIG. 5.

Figure 5:
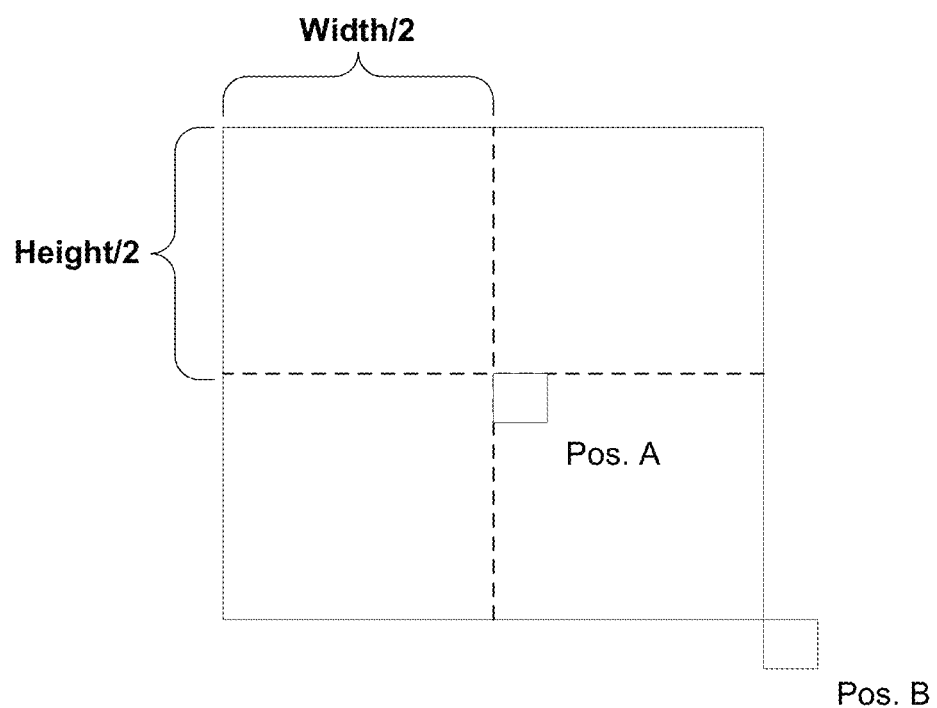
FIG. 5 is a conceptual diagram illustrating temporal neighboring blocks for neighboring block-based disparity vector (NBDV) derivation.

FIG. 5 is a conceptual diagram illustrating temporal neighboring blocks for neighboring block-based disparity vector (NBDV) derivation. For temporal neighboring blocks, the video coder checks up to two reference pictures from a current view. The two reference pictures are the co-located picture (e.g., the one signaled in the slice header as part of the TMVP process described above) and one of the random-access picture or the reference picture with the smallest POC difference and smallest temporal ID. In some examples, the video coder first checks the random-access picture, followed by the co-located picture. For instance, if the video coder identifies a disparity motion vector in the random-access picture, the video coder terminates the checking of temporal neighboring blocks. If the video coder does not identify a disparity motion vector in the random-access picture, the video coder checks the co-located picture (e.g., the picture identified in the slice header as part of the TMVP process). Each of these pictures is referred to as a candidate picture for purposes of the NBDV derivation.

For each candidate picture, the video coder check two candidate blocks. The first block is the center block (CR). For example, the CR block is located at Pos. A in FIG. 5, and is the center 4×4 block of the co-located region of the current PU. The second block is the bottom right block (BR). For example, the BR block is located at Pos. B in FIG. 5, and is the bottom-right 4×4 block of the co-located region of the current PU.

As described above, in addition to checking spatial and temporal neighboring blocks for a disparity motion vector, the video coder may identify an implicit disparity vector (IDV). An implicit disparity vector (IDV) is generated when a PU employs inter-view motion vector prediction, i.e., the candidate for AMVP or merge modes is derived from a corresponding block in the other view with the help of a disparity vector. Such a disparity vector is called an IDV. An IDV is stored to the PU for the purpose of disparity vector derivation. In other words, the video coder may have implemented NBDV techniques to derive a disparity vector for a neighboring block. The disparity vector for the neighboring block may function as a disparity vector for the current block. The disparity vector for the neighboring block functioning as a disparity vector for the current block is referred to as the IDV.

The video coder may check the spatial neighboring blocks, temporal neighboring blocks, and the IDV in a specific checking order. For example, the video coder may check spatial and temporal neighboring blocks for a disparity motion vector first, and if no disparity motion vector is identified, may check for an IDV.

In some examples, the video coder first checks spatial neighboring blocks and then temporal neighboring blocks. For example, the video coder checks the five spatial neighboring blocks in the following order: A1, B1, B0, A0 and B2. If one of them uses a disparity motion vector (DMV), the video coder terminates the checking process and uses the corresponding DMV as the final disparity vector. For temporal neighboring block, for each candidate picture, the video coder checks the two blocks in the following order: CR (Pos. A in FIG. 5) and BR (Pos. B in FIG. 5) for the first non-base view (e.g., random-access picture) or BR, CR for the second non-base view (e.g., for the co-located picture). If one of them uses DMV, the video coder terminates the checking process and uses the corresponding DMV as the final disparity vector. For IDV, the video coder checks the five spatial neighboring blocks in the following order: A0, A1, B0, B1 and B2. If one of them uses IDV (i.e., if a disparity vector exists for one of them), and the block is coded as skip/merge mode, the video coder terminates the checking process is terminated and uses the corresponding IDV as the final disparity vector.

In some examples, the video coder may further refine the disparity vector. For example, the video coder uses information in the coded depth map to refine the disparity vector generated from the NBDV scheme. For example, the accuracy of the disparity vector derived simply from the NBDV derivation technique may not be sufficiently accurate, and the accuracy can be increased by using information in the coded base view depth map. For example, in FIG. 3, view S0 is the base view, and for each of the texture view components of view S0, there may be a corresponding depth map. The video coder may perform disparity vector refinement using the depth map of the corresponding texture view components in base view S0.

For example, the video coder may locate a corresponding depth block by the NBDV derived disparity vector in the previously coded reference depth view, such as the base view. The size of the corresponding depth block is the same as that of current PU. The video coder may calculate a disparity vector from the collocated depth block based on the maximum value of the four corner depth values. The video coder sets the maximum depth value equal to the horizontal component of a disparity vector, and sets the vertical component of the disparity vector to 0.

The resulting, refined disparity vector is referred to as a "depth oriented neighboring block based disparity vector" (DoNBDV). The video coder replaces the disparity vector from the NBDV scheme with the newly derived disparity vector from the DoNBDV scheme for inter-view candidate derivation for the AMVP and merge modes. However, for inter-view residual prediction, the video coder uses the unrefined disparity vector. In addition, the refined disparity vector is stored as the motion vector of one PU if it is coded with backward view-synthesis prediction (VSP) mode. In this disclosure, the term disparity vector may refer an unrefined disparity vector or a refined disparity vector.

Figure 6:
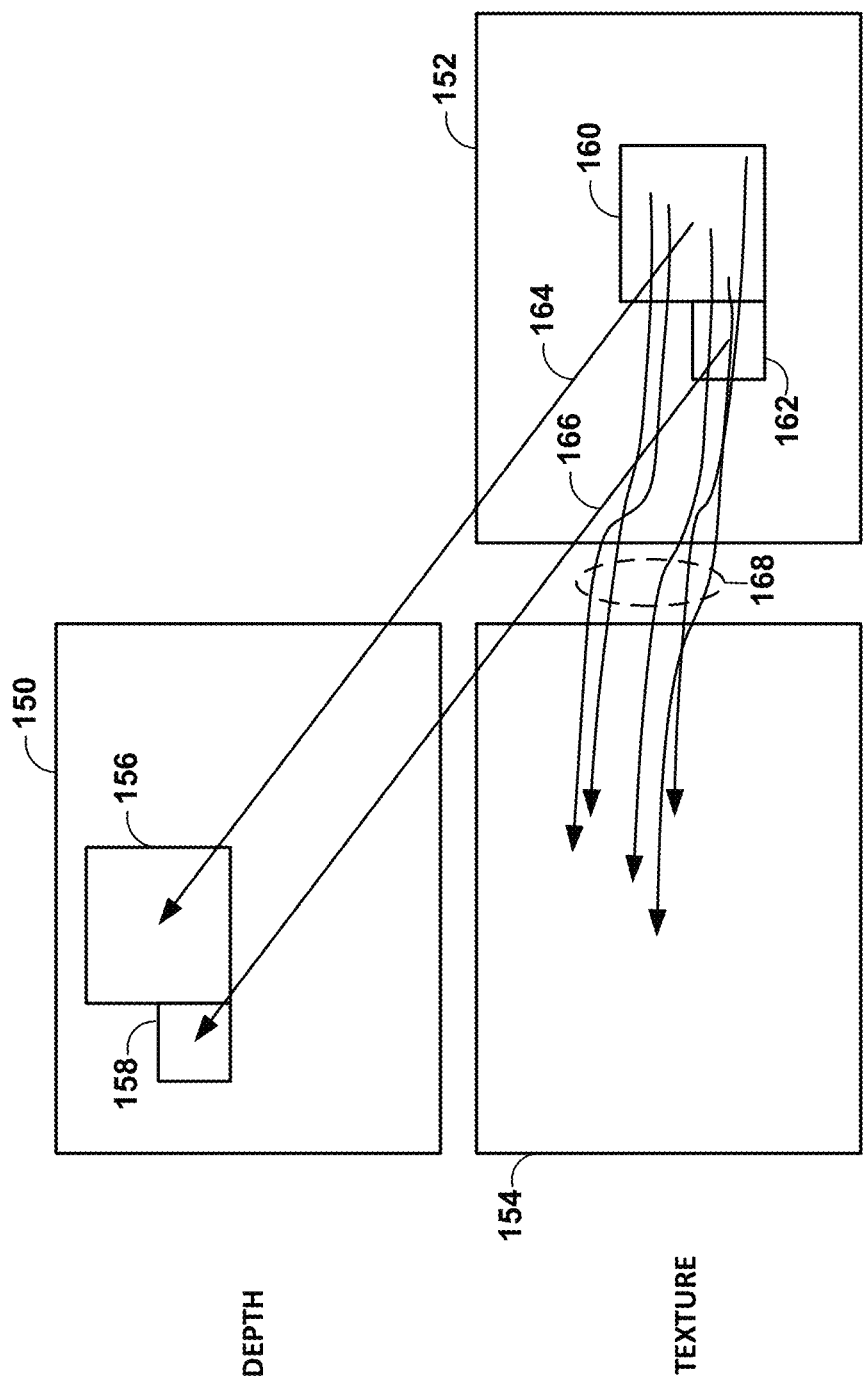
FIG. 6 is a conceptual diagram illustrating depth block derivation from a reference view associated with backward view synthesis prediction (BVSP).

FIG. 6 is a conceptual diagram illustrating depth block derivation from a reference view associated with backward view synthesis prediction (BVSP). For example, FIG. 6 is a conceptual diagram illustrating techniques related to BVSP using neighboring blocks. BVSP has been proposed, and adopted, as a technique for 3D-HEVC. The backward-warping VSP approach as proposed in JCT3V-00152 was adopted in the 3rd JCT-3V meeting. JCT3V-00152 is available from http://phenix.int-evey.fr/jct3v/doc_end_user/current_document.php?id=594.

The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms. In the following paragraphs, the term "BVSP" is used to indicate the backward-warping VSP approach in 3D-HEVC.

In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, some techniques first derive a disparity vector from the neighboring blocks, and then use the derived disparity vector to obtain a depth block from a reference view.

In the HTM 5.1 test model, there exists a process to derive a disparity vector predictor, known as NBDV. Let (dvx, dvy) denote the disparity vector identified from the NBDV function, and the current block position is (blockx, blocky). It was proposed to fetch a depth block at (blockx+dvx, blocky+dvy) in the depth image of the reference view. The fetched depth block would have the same size of the current prediction unit (PU), and it would then be used to do backward warping for the current PU. FIG. 6 illustrates the steps for locating a depth block from the reference view and then using the depth block for BVSP prediction.

In the example of FIG. 6, depth picture 150 and texture picture 154 correspond to the same view, while texture picture 152 corresponds to a different view. In particular, texture picture 152 includes current block 160 being coded relative to texture picture 154, acting as a reference picture. A video coder may refer to neighboring block 162, which neighbors current block 160. Neighboring block 162 includes a previously determined disparity vector 166. Disparity vector 166 may be derived as a disparity vector 164 for current block 160. Thus, disparity vector 164 refers to depth block 156 in depth picture 150 of the reference view.

The video coder may then use pixels (that is, depth values) of depth block 156 to determine disparity values 168 for pixels (that is, texture values) of current block 160, for performing backward warping. The video coder may then synthesize values for a predicted block (i.e., a BVSP reference block) for current block 160 from the pixels identified by disparity values 168. The video coder may then predict current block 160 using this predicted block. For instance, during video encoding by video encoder 20, video encoder 20 may calculate pixel-by-pixel differences between the predicted block and current block 160 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 160.

In some examples, if BVSP is enabled in the sequence, the NBDV process for inter-view motion prediction is changed. For each of the temporal neighboring blocks, if it uses a disparity motion vector, the video coder returns the disparity motion vector as the disparity vector and further refines the disparity vector with the method described above with respect to techniques for further refining the disparity vector. For each of the spatial neighboring blocks, the following apply. For each reference picture list 0 or reference picture list 1, the following apply, if it uses a disparity motion vector, the video coder returns the disparity motion vector as the disparity vector and is further refined with the method described above with respect to techniques for further refining the disparity vector. Otherwise, if it uses BVSP mode, the video coder returns the associated motion vector as the disparity vector. The disparity vector is further refined in a similar way as described above with respect to techniques for further refining the disparity vector. However, the maximum depth value is selected from all pixels of the corresponding depth block rather than four corner pixels. For each of the spatial neighboring blocks, if it is uses an IDV, the IDV is returned as the disparity vector and it is further refined with the method described above with respect to techniques for further refining the disparity vector. As described above, in this disclosure, the term "disparity vector" is used generically to refer to an unrefined disparity vector or a refined disparity vector.

For the indication of BVSP coded PUs, the video coder treats the introduced BVSP mode as a special inter-coded mode, and uses a flag to indicate the usage of BVSP mode, which the video coder may maintain for each PU. In some examples, rather than signaling the flag in the bitstream, the video coder adds a new merging candidate (BVSP merging candidate) to the merge candidate list (e.g., list of candidate motion vector predictors), and the flag is dependent on whether the decoded merge candidate index corresponds to a BVSP merging candidate.

The following describes the BVSP merging candidate. For instance, the video coder may set the reference picture index for each reference picture list to −1, and then set the motion vector for each reference picture list as the refined disparity vector.

The inserted position of BVSP merging candidate is dependent on the spatial neighboring blocks. For instance, if any of the five spatial neighboring blocks (A0, A1, B0, B1, or B2) is coded with the BVSP mode (i.e., the maintained flag of the neighboring block is equal to 1), the video coder treats the BVSP merging candidate as the corresponding spatial merging candidate, and inserts it into the merge candidate list. In some examples, the video coder inserts the BVSP merging candidate only once into the merge candidate list. Otherwise (e.g., if none of the five spatial neighboring blocks are coded with the BVSP mode), the video coder inserts the BVSP merging candidate into the merge candidate list just before the temporal merging candidates. In some examples, during the combined bi-predictive merging candidate derivation process, the video coder may check additional conditions to avoid including the BVSP merging candidate.

The following describes the prediction derivation process. For each BVSP coded PU with its size denoted by N×M, the video coder further partitions the PU into several sub-regions with the size equal to K×K (where K may be 4 or 2). For each sub-region, the video coder derives a separate disparity motion vector, and predicts each sub-region from one block located by the derived disparity motion vector in the inter-view reference picture. In other words, the size of motion-compensation units for BVSP coded PUs are set to K×K. In some common test conditions, K is set to 4.

The following describes the disparity motion vector derivation process. For each sub-region (e.g., 4×4 block) within one PU coded with BVSP mode, the video coder first locates a corresponding 4×4 depth block in the reference depth view with the refined disparity vector described above. The video coder then selects the maximum value of the sixteen depth pixels in the corresponding depth block. Next, the video coder converts the maximum value to the horizontal component of a disparity motion vector. The vertical component of the disparity motion vector is set to 0.

As described above, one of the video coding tools that uses the disparity vector is inter-view motion prediction. The following describes inter-view motion prediction, including the manner in which the disparity vector is used.

Figure 7:
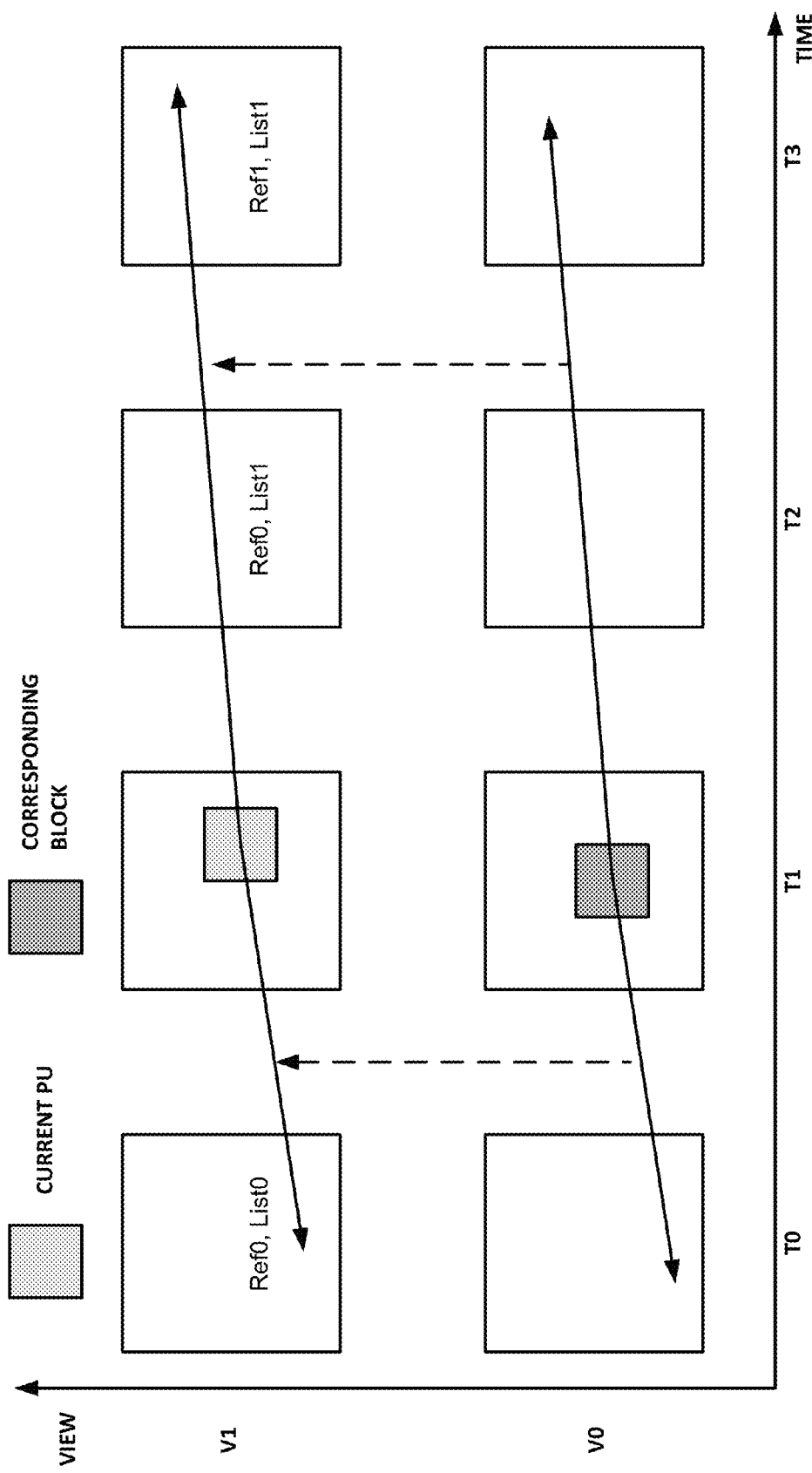
FIG. 7 is a block diagram illustrating derivation of inter-view predicted motion vector candidate.

FIG. 7 is a block diagram illustrating derivation of inter-view predicted motion vector candidate. Based on the disparity vector derived from the DoNBDV scheme, a new motion vector candidate, Inter-view Predicted Motion Vector Candidate (IPMVC), if available, may be added to AMVP and skip/merge modes by the video coder. The inter-view predicted motion vector, if available, is a temporal motion vector.

Because skip mode has the same motion vector derivation process as merge mode, the techniques described below may apply to both merge and skip modes. For the merge/skip mode, the video coder derives the inter-view predicted motion vector according to the following steps. The video coder locates a corresponding block of a current block (e.g., current PU/CU) in a reference view of the same access unit using the disparity vector. If the corresponding block is not intra-coded and not inter-view predicted, and its reference picture has a POC value equal to that of one entry in the same reference picture list of the current PU/CU, the video coder converts the reference index based on the POC value, and derives the motion information (prediction direction, reference pictures, and motion vectors) of the corresponding block to be the inter-view predicted motion vector.

For example, in FIG. 7, the current block is in view V1 at time T1. The video coder may identify the corresponding block for the current block from reference picture at time T1 in view V0. The video coder may derive the inter-view predicted vector as the motion vector(s) for the corresponding block in the reference picture in view V0, as illustrated by the vertical dashed arrows.

In some examples, the corresponding block is identified using the following equations to determine a location in the reference picture in a reference view, and then the block that covers the determined location is identified as the reference block (e.g., corresponding block).

$$x\text{Ref}=\text{Clip3}(0, \text{PicWidthInSamples}_L-1, xP+((nPSW-1)\gg1)+((mv\text{Disp}[0]+2)\gg2)) \quad \text{(H-124)}$$

$$y\text{Ref}=\text{Clip3}(0, \text{PicHeightInSamples}_L-1, yP+((nPSH-1)\gg1)+((mv\text{Disp}[1]+2)\gg2)) \quad \text{(H-125)}$$

In other words, in 3D-HEVC, the reference 4×4 block is identified by two steps, the first step is to identify a pixel with a disparity vector and the second step is to get the 4×4 block (with a unique set of motion information corresponding to RefPicList0 or RefPicList1 respectively) and utilizing the motion information to create a merge candidate. In some examples, the above equation is used to determine the location in the reference picture of the reference view (e.g. to determine the location of location C0 of FIG. 4).

However, in accordance with the techniques described in this disclosure, using the above equation to determine a location in the reference picture may not statistically tend to provide the optimum video coding gains. Accordingly, in some examples, the following equations may be used to determine the location within the reference picture (e.g., determine the location of location C3 of FIG. 4).

$$x\text{Ref}=\text{Clip3}(0, \text{PicWidthInSamples}_L-1, xP+((nPSW)\gg1)+((mv\text{Disp}[0]+2)\gg2)) \quad \text{(H-124)}$$

$$y\text{Ref}=\text{Clip3}(0, \text{PicHeightInSamples}_L-1, yP+((nPSH)\gg1)+((mv\text{Disp}[1]+2)\gg2)) \quad \text{(H-125)}$$

In addition, in some examples, the video coder converts the disparity vector to an inter-view disparity motion vector, and adds the inter-view disparity motion vector into the merge candidate list in a different position from the IPMVC, or adds the inter-view disparity motion vector into the AMVP candidate list in the same position as IPMVC when it is available. Either the IPMVC or the Inter-view Disparity Motion Vector Candidate (IDMVC) is called 'inter-view candidate' in this context.

In the merge/skip mode, the IPMVC, if available, the video coder inserts the IPMVC before all spatial and temporal merging candidates to the merge candidate list. The video coder inserts the IDMVC before the spatial merging candidate derived from A0.

The following describes merge candidate list construction for texture coding in 3D-HEVC. The video coder derives the disparity vector the DoNBDV method. With the disparity vector, the merging candidate list construction process in 3D-HEVC is defined as follows.

The video coder derives the IPMVC by the procedure described above. If it is available, the video coder inserts the IPMVC into the merge list. Then, in 3D-HEVC, the video coder performs the derivation process for spatial merging candidates and IDMVC insertion. For example, the video coder may check the motion information of spatial neighboring PUs in the following order: A1, B1, B0, A0, or B2.

The video coder may perform constrained pruning by the following procedures. If A1 and IPMVC have the same motion vectors and the same reference indices, the video coder does not insert A1 into the candidate list. Otherwise, the video coder inserts the A1 into the list. If B1 and A1/IPMVC have the same motion vectors and the same reference indices, the video coder does not insert B1 into the candidate list. Otherwise, the video coder inserts B1 into the list. If B0 is available, the video coder adds B0 to the candidate list. The IDMVC is derived by the procedure described above. If the IDMVC is available and is different from the candidates derived from A1 and B1, the video coder inserts the IDMVC into the candidate list. If BVSP is enabled for the whole picture or for the current slice, then the video coder inserts the BVSP merging candidate into the merge candidate list. If A0 is available, the video coder adds A0 to the candidate list. If B2 is available, the video coder adds it to the candidate list.

Next, the video coder performs the derivation process for temporal merging candidate. Similar to the temporal merging candidate derivation process in HEVC where the motion information of the co-located PU is utilized, the target reference picture index of the temporal merging candidate may be changed, instead of fixing it to be 0. When the target reference index equal to 0 corresponds to a temporal reference picture (in the same view) while the motion vector of the co-located prediction unit (PU) points to an inter-view reference picture, the video coder changes the reference index to another index which corresponds to the first entry of an inter-view reference picture in the reference picture list (e.g., the first entry with a reference picture in another view). When the target reference index equal to 0 corresponds to an inter-view reference picture while the motion vector of the co-located prediction unit (PU) points to a temporal reference picture, the video coder changes the reference index to another index which corresponds to the first entry of temporal reference picture in the reference picture list (e.g., the first entry with a reference picture in the same view).

Then follows the derivation process for combined bi-predictive merging candidates in 3D-HEVC. If the total number of candidates derived from the above two steps are less than the maximum number of candidates, the video coder performs the same process as defined in HEVC, except the specification of l0CandIdx and l1CandIdx. The relationship among combIdx, l0CandIdx and l1CandIdx are defined in the following table:

coding. An idea behind the motion vector inheritance (MVI) is to exploit the similarity of the motion characteristics between the texture images and associated depth images.

Figure 8:
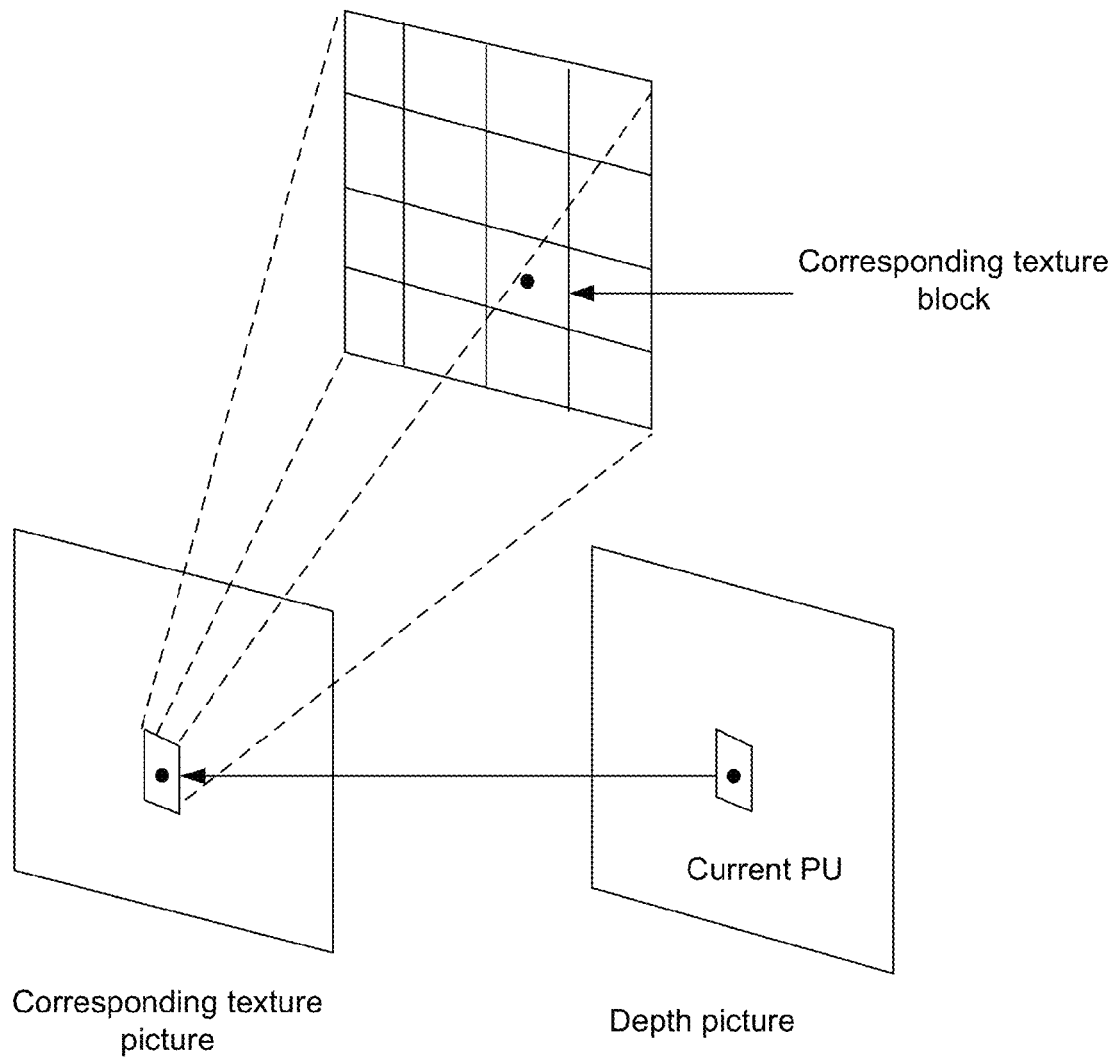
FIG. 8 is a conceptual diagram illustrating derivation of a motion vector inheritance (MVI) candidate for depth coding.

For a given PU in the depth image, the MVI candidate reuses motion vectors and reference indices of the already coded corresponding texture block, if it is available. That is, the motion information for a texture block is used as motion information for the corresponding depth block for the same picture and view. FIG. 8 shows an example of the derivation process of the MVI candidate where the corresponding texture block is selected as the 4×4 block located to the right bottom of the center of the current PU.

In some examples, the video coder uses motion vectors with integer precision in depth coding, and uses quarter precision of motion vectors for texture coding. Therefore, the video coder may (e.g., shall) scale the motion vector of the corresponding texture block before using as an MVI candidate.

With the MVI candidate generation, the merge candidate list for the depth views is constructed as follows. The video coder derives the MVI based on the procedure described above. If it is available, the video coder inserts the MVI into the merge list. Next, the video coder may perform the derivation process for spatial merging candidates and IDMVC insertion in 3D-HEVC. For example, the video may check the motion information of spatial neighboring PUs in the following order: A1, B1, B0, A0, or B2.

The video coder may perform constrained pruning using the following procedures. If A1 and MVI have the same motion vectors and the same reference indices, the video coder does not insert A1 into the candidate list. If B1 and A1/MVI have the same motion vectors and the same reference indices, the video coder does not insert B1 into the candidate list. If B0 is available, the video coder adds B0 to the candidate list. If A0 is available, the video coder adds A0 to the candidate list. If B2 is available, the video coder adds B2 to the candidate list.

The video coder may then perform the derivation process for temporal merging candidate. For example, the video coder may perform similar steps as those for the temporal merging candidate derivation process in HEVC, where the motion information of the co-located PU is utilized. How-

TABLE 1

| Specification of l0CandIdx and l1CandIdx in 3D-HEVC |||||||||||||||||||||
|---|---|---|---|---|---|---|---|---|---|---|---|---|---|---|---|---|---|---|---|---|
| combIdx | 0 | 1 | 2 | 3 | 4 | 5 | 6 | 7 | 8 | 9 | 10 | 11 | 12 | 13 | 14 | 15 | 16 | 17 | 18 | 19 |
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

Then follows the derivation process for zero motion vector merging candidates. The video coder may apply the same procedure as defined in HEVC for the zero motion vector merging candidates.

In the latest software, the total number of candidates in the merge (MRG) list is up to 6 and five_minus_max_num_merge_cand is signaled to specify the maximum number of the MRG candidates subtracted from 6 in slice header. the syntax element five_minus_max_num_merge_cand is in the range of 0 to 5, inclusive.

FIG. 8 is a conceptual diagram illustrating derivation of a motion vector inheritance (MVI) candidate for depth coding. The following describes motion vector inheritance for depth ever, the target reference picture index of the temporal merging candidate may be changed as explained above with respect to the description of merge candidate list construction instead of fixing it to be 0.

The video coder may then implement the derivation process for combined bi-predictive merging candidates in 3D-HEVC. For example, if the total number of candidates derived from the above two steps are less than the maximum number of candidates, the video coder may perform the same process as defined in HEVC, except the specification of l0CandIdx and l1CandIdx. The relationship among combIdx, l0CandIdx and l1CandIdx are defined in table 1 (above) of this disclosure.

The video coder may then implement the derivation process for zero motion vector merging candidates. For example, the video coder may perform the same procedure as defined in HEVC.

As described above, in addition to inter-view motion prediction, another video coding tool that relies on the disparity vector is the inter-view residual prediction. The following provides additional description for inter-view residual prediction.

Figure 9:
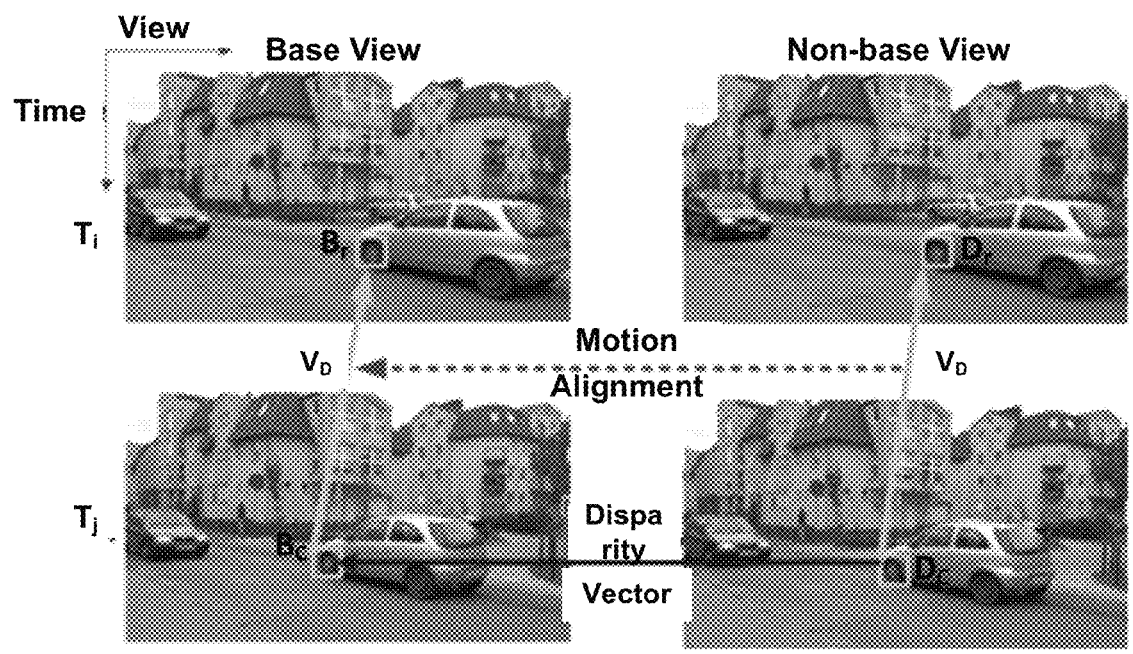
FIG. 9 is a conceptual diagram illustrating an example prediction structure of advanced residual prediction.

FIG. 9 is a conceptual diagram illustrating an example prediction structure of advanced residual prediction. In the current 3D-HEVC, to more efficiently utilize the correlation between the residual signal of two views, inter-view residual prediction was realized by the so-called Advanced Residual Prediction (ARP), wherein the residual of the reference block identified with the disparity vector was generated on-the-fly, as depicted in FIG. 9, instead of maintaining a residual picture for the reference view and directly predicting the residual within the reference block in the residual picture.

As shown in FIG. 9, to better predict the residual of the current block in a non-base view, denoted as Dc, the video coder first identifies reference block Bc by the disparity vector, and the motion compensation of the reference block is invoked to derive the residual between the prediction signal Br and the reconstructed signal of the reference block Bc. When the ARP mode is invoked, the video coder adds the predicted residual on top of the prediction signal of the non-base view, generated by motion compensation from the block Dr in the reference picture of the non-base view. A potential advantage of the ARP mode is that the motion vector used by the reference block (when generating the residue for ARP) is aligned with the motion vector of the current block, so the residual signal of the current block can be more precisely predicted. Therefore, the energy of the residue can be significantly reduced.

Figure 10:
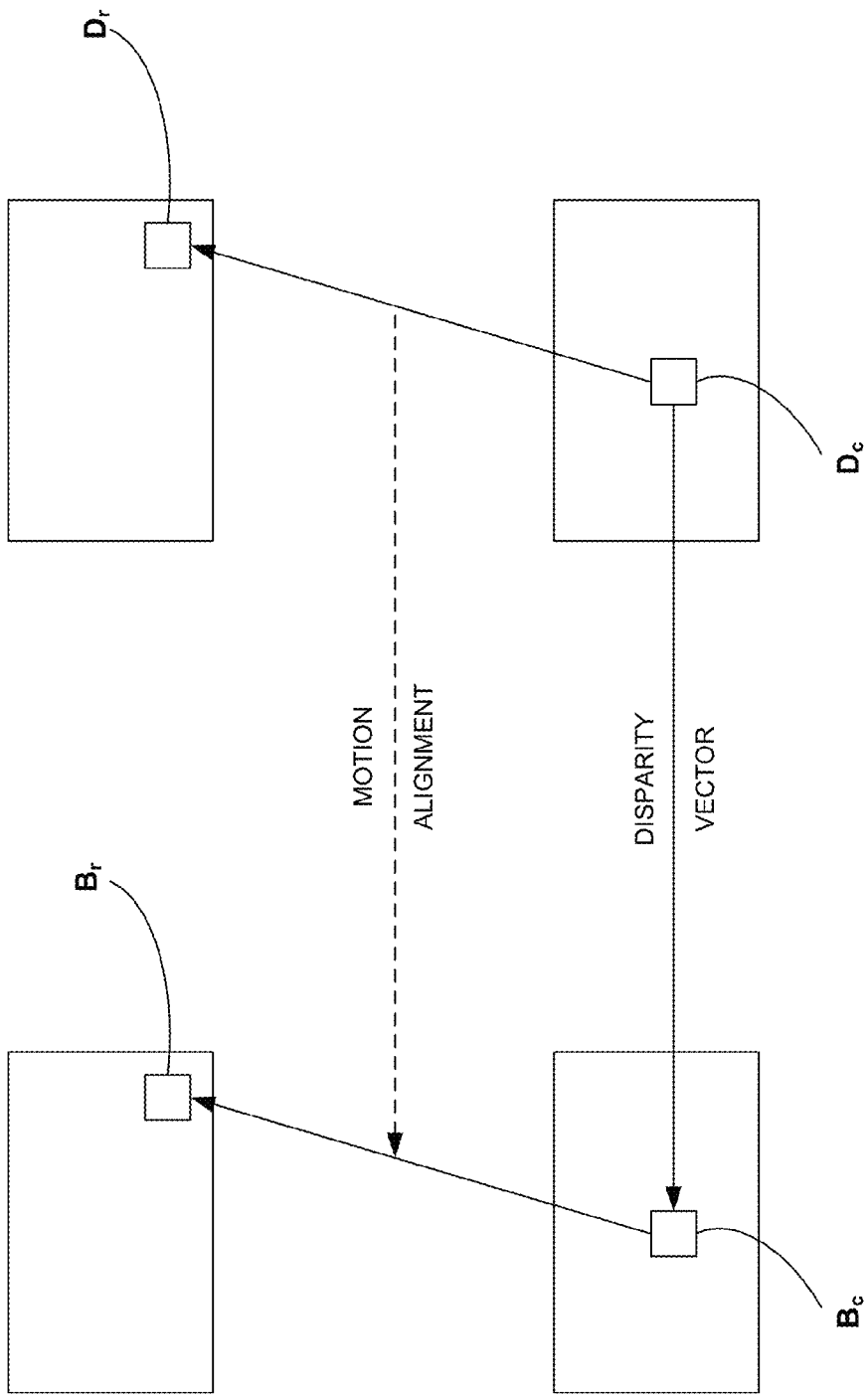
FIG. 10 is another conceptual diagram illustrating an example prediction structure of advanced residual prediction.

FIG. 10 is another conceptual diagram illustrating an example prediction structure of advanced residual prediction. For example, FIG. 10 illustrates various components of FIG. 9, but without texture details of the different images. It will be appreciated that, for ease of illustration purposes only, FIG. 10 is not drawn to scale with respect to FIG. 9.

Since quantization difference(s) between base (reference) and non-base views may lead to less prediction accuracy, the video coder adaptively applies two weighting factors to the residue generated from the reference view: 0.5 and 1. Since additional motion compensation at the base (reference) view may require a significant increase in memory access and calculations, several ways to make the design more practical with minor sacrifice of coding efficiency have been adopted.

As one example, ARP mode is only enabled when the Prediction Unit (PU) is coded with 2N×2N, to reduce the computations, especially by video encoder 20. Also, bi-linear filters are adopted for the motion compensation of both the reference block and the current block, to significantly reduce the memory access for blocks coded with the ARP mode. Furthermore, to improve the cache efficiency, although motion vectors may point to different pictures in the non-base view, the reference picture in the base view is fixed. In this case, the motion vector of the current block may need to be scaled based on the picture distances.

The following describes some other techniques for depth inter coding. For example, in U.S. Provisional Applications Nos. 61/840,400, 61/847,942, and 61/890,107, filed Jun. 27, 2013, Jul. 18, 2013, and Oct. 11, 2013, respectively, and U.S. patent application Ser. Nos. 14/316,088 and 14/316,145 both filed Jun. 26, 2014, techniques are described in which, when coding a depth picture, a disparity vector is converted by an estimated depth value from the neighboring samples of the current block. Furthermore, more merge candidates can be derived (e.g., by accessing the reference block of the base view identified by a disparity vector).

Figure 11:
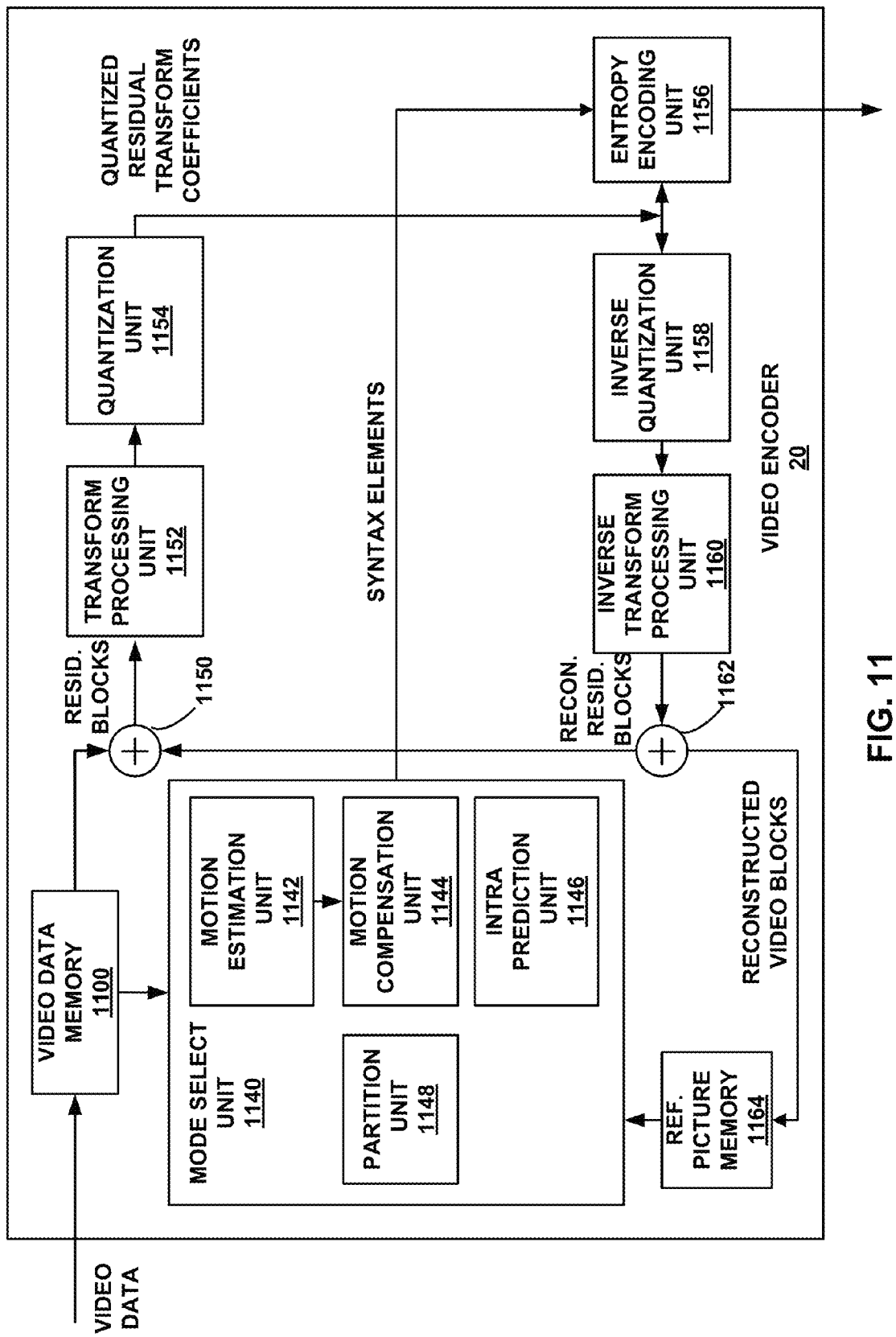
FIG. 11 is a block diagram illustrating an example of a video encoder that may implement or otherwise utilize techniques for block identification in accordance with one or more example techniques described in this disclosure.

FIG. 11 is a block diagram illustrating an example of video encoder 20 that may implement or otherwise utilize techniques for block identification in accordance with one or more example techniques described in this disclosure. Video encoder 20 may perform intra- and inter-coding (i.e., intra-prediction encoding or inter-prediction encoding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In addition, video encoder 20 may be configured to perform inter-view prediction in which a reference picture resides in a view other than the view that includes the current picture. In this sense, inter-view prediction may be considered as a form of inter-coding (e.g., inter-prediction encoding). Moreover, video encoder 20 may be configured to implement video coding tools that rely on a disparity vector as part of inter-view prediction. For example, video encoder 20 may be configured to implement inter-view motion prediction and inter-view residual prediction, as two examples.

To perform inter-view motion prediction and inter-view residual prediction, video encoder 20 may derive a disparity vector for a current block. In the techniques described in this disclosure, video encoder 20 may set the start position of the disparity vector to start from the bottom-right pixel in the center 2×2 sub-block within the current block, rather than the top-left pixel in the center 2×2 sub-block. Video encoder 20 may determine the block to which the disparity vector refers based on the set starting position, and utilize the motion information of the block for video coding tools that rely on the disparity vector.

As shown in FIG. 11, video encoder 20 receives a current video block within a video frame to be encoded. In the example of FIG. 10, video encoder 20 includes video memory data 1100, mode select unit 1140, reference picture memory 1164, summer 1150, transform processing unit 1152, quantization unit 1154, and entropy encoding unit 1156. Mode select unit 1140, in turn, includes motion compensation unit 1144, motion estimation unit 1142, intra-prediction unit 1146, and partition unit 1148. For video block reconstruction, video encoder 20 also includes inverse quantization unit 1158, inverse transform processing unit 1160, and summer 1162. A deblocking filter (not shown in FIG. 11) may also be included to filter block boundaries to remove blockiness artifacts from reconstructed video. If desired, the deblocking filter would typically filter the output of summer 1162. Additional filters (in loop or post loop) may also be used in addition to the deblocking filter. Such filters are not shown for brevity, but if desired, may filter the output of summer 1150 (as an in-loop filter).

As shown in FIG. 11, video data memory 1100 receives video data that is used for encoding a current video block within a video picture. Video data memory 1100 may store video data to be encoded by the components of video encoder 20 (e.g., configured to store video data) or store video data that is to be used for encoding video pictures. The video data stored in video data memory 1100 may be obtained, for example, from video source 18. Reference picture memory 1164 (also referred to as a decoding picture buffer (DPB)) stores reference video data for use in encoding video data by video encoder 20 (e.g., in intra-coding modes or inter-coding modes). Video data memory 1100 and reference picture memory 1164 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1100 and DPB 1164 may be provided by the same memory device or separate memory devices. In various examples, video data memory 1100 may be on-chip with other components of video encoder 20, or off-chip relative to those components.

During the encoding process, video encoder 20 receives a video picture (e.g., a frame) or slice to be coded. The picture or slice may be divided into multiple video blocks. Motion estimation unit 1142 and motion compensation unit 1144 perform inter-predictive coding of the received video block relative to one or more blocks in one or more reference frames to provide temporal prediction. In addition, motion estimation unit 1142 and motion compensation unit 1144 may be perform inter-predictive coding on the receive video block relative to one or more block in one or more reference pictures in a view other than the view that includes the current block. Intra-prediction unit 1146 may alternatively perform intra-predictive coding of the received video block relative to one or more neighboring blocks in the same picture or slice as the block to be coded to provide spatial prediction. Video encoder 20 may perform multiple coding passes (e.g., to select an appropriate coding mode for each block of video data).

Moreover, partition unit 1148 may partition blocks of video data into sub-blocks, based on evaluation of previous partitioning schemes in previous coding passes. For example, partition unit 1148 may initially partition a picture or slice into LCUs, and partition each of the LCUs into sub-CUs based on rate-distortion analysis (e.g., rate-distortion optimization). Mode select unit 1140 may further produce a quadtree data structure indicative of partitioning of an LCU into sub-CUs. Leaf-node CUs of the quadtree may include one or more PUs and one or more TUs.

Mode select unit 1140 may select one of the coding modes, intra or inter (including inter-view), e.g., based on error results, and provides the resulting intra- or inter-coded block to summer 1150 to generate residual block data and to summer 1162 to reconstruct the encoded block for use as a reference picture. Mode select unit 1140 also provides syntax elements, such as motion vectors, intra-mode indicators, partition information, and other such syntax information, to entropy encoding unit 1156.

Motion estimation unit 1142 and motion compensation unit 1144 may be highly integrated, but are illustrated separately for conceptual purposes. Motion estimation, performed by motion estimation unit 1142, is the process of generating motion vectors (including disparity motion vectors), which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 1164. For example, video encoder 20 may interpolate values of one-quarter pixel positions, one-eighth pixel positions, or other fractional pixel positions of the reference picture. Therefore, motion estimation unit 1142 may perform a motion search relative to the full pixel positions and fractional pixel positions and output a motion vector with fractional pixel precision.

Motion estimation unit 1142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 1164. Motion estimation unit 1142 sends the calculated motion vector to entropy encoding unit 1156 and motion compensation unit 1144.

Motion compensation, performed by motion compensation unit 1144, may involve fetching or generating the predictive block based on the motion vector determined by motion estimation unit 1142. Again, motion estimation unit 1142 and motion compensation unit 1144 may be functionally integrated, in some examples. Upon receiving the motion vector for the PU of the current video block, motion compensation unit 1144 may locate the predictive block to which the motion vector points in one of the reference picture lists. Summer 1150 forms a residual video block by subtracting pixel values of the predictive block from the pixel values of the current video block being coded, forming pixel difference values, as discussed below. In general, motion estimation unit 1142 performs motion estimation relative to luma components, and motion compensation unit 1144 uses motion vectors calculated based on the luma components for both chroma components and luma components. Mode select unit 1140 may also generate syntax elements associated with the video blocks and the video slice for use by video decoder 30 in decoding the video blocks of the video slice.

Intra-prediction unit 1146 may intra-predict a current block, as an alternative to the inter-prediction performed by motion estimation unit 1142 and motion compensation unit 1144, as described above. In particular, intra-prediction unit 1146 may determine an intra-prediction mode to use to encode a current block. In some examples, intra-prediction unit 1146 may encode a current block using various intra-prediction modes, e.g., during separate encoding passes, and intra-prediction unit 1146 (or mode select unit 1140, in some examples) may select an appropriate intra-prediction mode to use from the tested modes.

For example, intra-prediction unit 1146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 1146 may calculate ratios from the distortions and rates for the various encoded blocks to determine which intra-prediction mode exhibits the best rate-distortion value for the block.

After selecting an intra-prediction mode for a block, intra-prediction unit 1146 may provide information indicative of the selected intra-prediction mode for the block to entropy encoding unit 1156. Entropy encoding unit 1156 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 1140 from the original video block being coded. Summer 1150 represents the component or components that perform this subtraction operation. Transform processing unit 1152 applies a transform, such as a discrete cosine transform (DCT) or a conceptually similar transform, to the residual block, producing a video block comprising residual transform coefficient values. Transform processing unit 1152 may perform other transforms which are conceptually similar to DCT. Wavelet transforms, integer transforms, sub-band transforms or other types of transforms could also be used. In any case, transform processing unit 1152 applies the transform to the residual block, producing a block of residual transform coefficients. The transform may convert the residual information from a pixel value domain to a transform domain, such as a frequency domain. Transform processing unit 1152 may send the resulting transform coefficients to quantization unit 1154. Quantization unit 1154 quantizes the transform coefficients to further reduce bit rate. The quantization process may reduce the bit depth associated with some or all of the coefficients. The degree of quantization may be modified by adjusting a quantization parameter. In some examples, quantization unit 1154 may then perform a scan of the matrix including the quantized transform coefficients. Alternatively, entropy encoding unit 1156 may perform the scan.

Following quantization, entropy encoding unit 1156 entropy codes the quantized transform coefficients. For example, entropy encoding unit 1156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. In the case of context-based entropy encoding, context may be based on neighboring blocks. Following the entropy encoding by entropy encoding unit 56, the encoded bitstream may be transmitted to another device (e.g., video decoder 30) or archived for later transmission or retrieval.

Inverse quantization unit 1158 and inverse transform processing unit 1160 apply inverse quantization and inverse transformation, respectively, to reconstruct the residual block in the pixel domain, e.g., for later use as a reference block. Motion compensation unit 1144 may calculate a reference block by adding the residual block to a predictive block of one of the frames of reference picture memory 1164. Motion compensation unit 1144 may also apply one or more interpolation filters to the reconstructed residual block to calculate sub-integer pixel values for use in motion estimation. Summer 1162 adds the reconstructed residual block to the motion compensated prediction block produced by motion compensation unit 1144 to produce a reconstructed video block for storage in reference picture memory 1164. The reconstructed video block may be used by motion estimation unit 1142 and motion compensation unit 1144 as a reference block to inter-code a block in a subsequent video frame.

Video encoder 20 of FIG. 11 represents an example of a video encoder configured to perform various methods described in this disclosure. For example, mode select unit 1140 may be configured to implement the techniques described in this disclosure. In some examples, mode select unit 1140 in conjunction with one or more other units in video encoder 20 or one or more units other than mode select unit 1140 may be configured to implement the example techniques described in this disclosure. In some examples, a processor (not illustrated) of video encoder 20 or source device 12 may be configured to implement the example techniques described in this disclosure.

Figure 12:
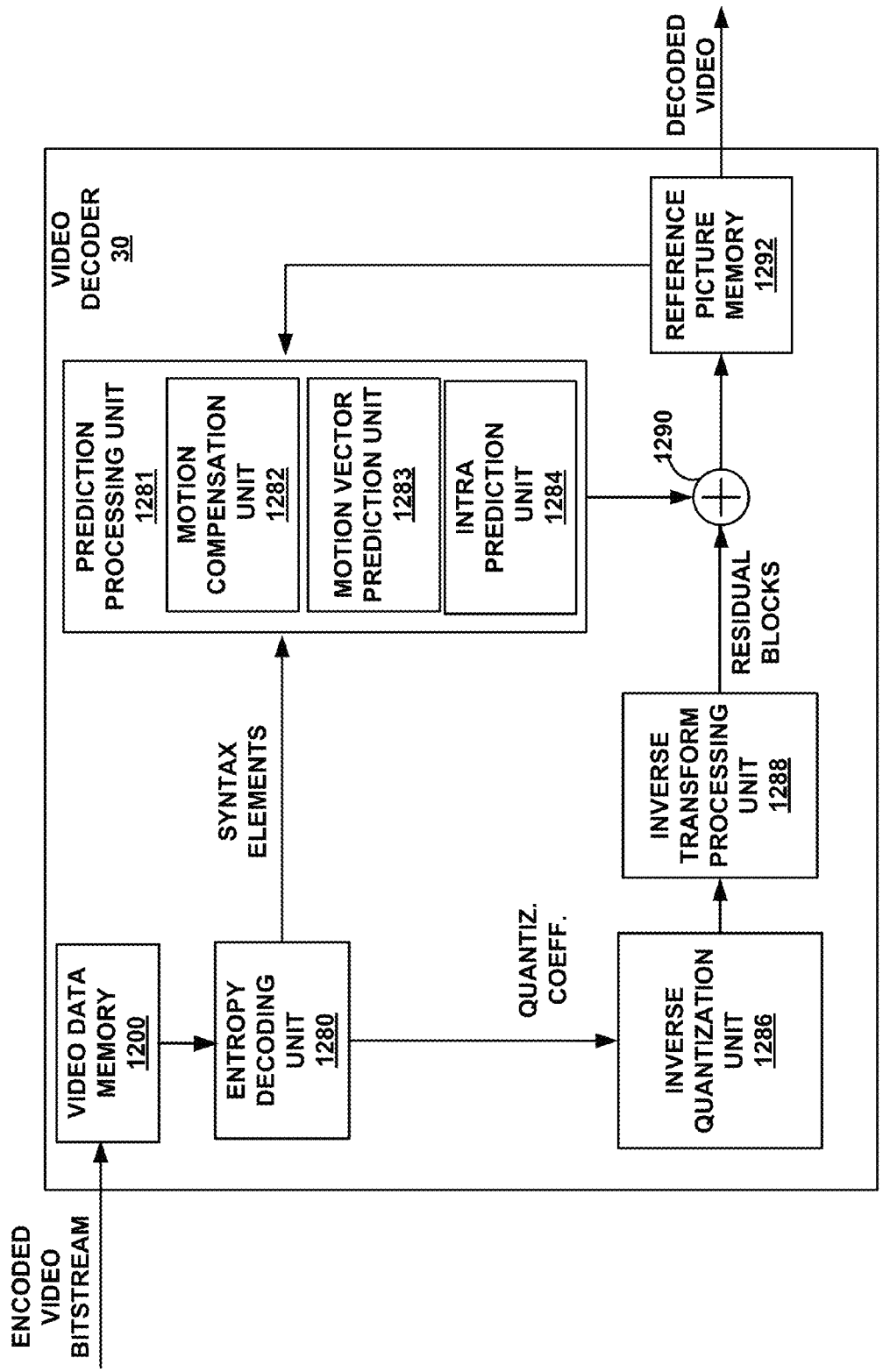
FIG. 12 is a block diagram illustrating an example of a video decoder that may implement or otherwise utilize techniques for block identification in accordance with one or more example techniques described in this disclosure.

FIG. 12 is a block diagram illustrating an example of a video decoder that may implement or otherwise utilize techniques for block identification in accordance with one or more example techniques described in this disclosure. In the example of FIG. 12, video decoder 30 includes video data memory 1200, an entropy decoding unit 1280, and prediction processing unit 1281 that includes motion compensation unit 1282, motion vector prediction unit 1283, and intra prediction unit 1284. Video decoder 30 also includes inverse quantization unit 1286, inverse transform processing unit 1288, reference picture memory 1292, and summer 1290. Video decoder 30 may, in some examples, perform a decoding pass generally reciprocal to the encoding pass described with respect to video encoder 20 (FIG. 11). For instance, video decoder 30 may perform intra-prediction decoding or inter-prediction decoding.

In the example of FIG. 12, video data memory 1200 receives encoded video. Video data memory 1200 may store video data (e.g., configured to store video data), such as an encoded video bitstream, to be decoded by the components of video decoder 30. The video data stored in video data memory 1200 may be obtained from a local video source, such as a camera, via wired or wireless network communication of video data, or by accessing physical data storage media. Video data memory 1200 may form a coded picture buffer (CPB) that stores encoded video data from an encoded video bitstream.

Reference picture memory 1292 is one example of a decoded picture buffer (DPB) that stores reference video data for use in decoding video data by video decoder 30 (e.g., in intra-coding mode, and inter-coding mode). Video data memory 1200 and reference picture memory 1292 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1200 and reference picture memory 1292 may be provided by the same memory device or separate memory devices. In various examples, video data memory 1200 may be on-chip with other components of video decoder 30, or off-chip relative to those components.

Video encoder 30 of FIG. 12 represents an example of a video decoder configured to perform various methods described in this disclosure. For example, prediction processing unit 1281 may be configured to implement the techniques described in this disclosure. In some examples, prediction processing unit 1281 in conjunction with one or more other units in video decoder 30 or one or more units other than prediction processing unit 1281 may be configured to implement the example techniques described in this disclosure. In some examples, a processor (not illustrated) of video decoder 30 or destination device 14 may be configured to implement the example techniques described in this disclosure.

Motion compensation unit 1282 may generate prediction data based on motion vectors received from entropy decoding unit 1280, while intra-prediction unit 1284 may generate prediction data based on intra-prediction mode indicators received from entropy decoding unit 1280. Motion vector prediction unit 1283 may predict motion vectors for inter-prediction (e.g., inter-prediction decoding), including disparity motion vectors.

During the decoding process, video decoder 30 receives an encoded video bitstream that represents video blocks of an encoded video slice and associated syntax elements from video encoder 20 (or through an intermediate device such as storage device 31). Entropy decoding unit 1280 of video decoder 30 entropy decodes the bitstream to generate quantized coefficients, motion vectors or intra-prediction mode indicators, and other syntax elements. Entropy decoding unit 1280 forwards the motion vectors to and other syntax elements to motion compensation unit 1282 of prediction processing unit 1281. Video decoder 30 may receive the syntax elements at the video slice level and/or the video block level.

When the video slice is coded as an intra-coded (I) slice, intra prediction unit 1284 of prediction processing unit 1281 may generate prediction data for a video block of the current video slice based on a signaled intra prediction mode and data from previously decoded blocks of the current frame or picture. When the video picture is coded as an inter-coded (i.e., B, P based on temporal motion vector or disparity motion vector) slice, motion compensation unit 1282 produces predictive blocks for a video block of the current video slice based on the motion vectors and other syntax elements received from entropy decoding unit 1280. The predictive blocks may be produced from one of the reference pictures within one of the reference picture lists. Video decoder 30 may construct the reference picture lists, List 0 and List 1, using default construction techniques based on reference pictures stored in reference picture memory 1292. Motion compensation unit 1282 determines prediction information for a video block of the current video slice by parsing the motion vectors and other syntax elements, and uses the prediction information to produce the predictive blocks for the current video block being decoded. For example, motion compensation unit 1282 uses some of the received syntax elements to determine a prediction mode (e.g., intra- or inter-prediction) used to code the video blocks of the video slice, an inter-prediction slice type (e.g., B slice, P slice based on temporal motion vector or disparity motion vector), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 1282 may also perform interpolation based on interpolation filters. Motion compensation unit 1282 may use interpolation filters as used by video encoder 20 during encoding of the video blocks to calculate interpolated values for sub-integer pixels of reference blocks. In this case, motion compensation unit 1282 may determine the interpolation filters used by video encoder 20 from the received syntax elements and use the interpolation filters to produce predictive blocks.

Inverse quantization unit 1286 inverse quantizes, i.e., de-quantizes, the quantized transform coefficients provided in the bitstream and decoded by entropy decoding unit 1280. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 1288 applies an inverse transform, e.g., an inverse DCT, an inverse integer transform, or a conceptually similar inverse transform process, to the transform coefficients in order to produce residual blocks in the pixel domain.

After motion compensation unit 1282 generates the predictive block for the current video block based on the motion vectors and other syntax elements, video decoder 30 forms a decoded video block by summing the residual blocks from inverse transform unit 1288 with the corresponding predictive blocks generated by motion compensation unit 1282. Summer 1290 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 1292, which stores reference pictures used for subsequent motion compensation. Reference picture memory 1292 also stores decoded video for later presentation on a display device, such as display device 32 of FIG. 1.

In this disclosure, video encoder 20 and video decoder 30 may be generically referred to as a video coder. For example, a device for video coding (e.g., source device 12, destination device 14, a micro-processor, or an integrated circuit (IC) includes a video data memory (e.g., video data memory 1100 or video data memory 1200) configured to store video data. The video coder (e.g., video encoder 20 or video decoder 30) includes one or more processors and is configured to determine a disparity vector for a current block in a current picture in a current view based on the stored video data. For instance, the stored video data may include motion information of neighboring block, and the video coder may determine whether any of the neighboring block were inter-predicted with a disparity motion vector or whether an IDV exists for a neighboring block based on the stored video data. The video coder may determine the disparity vector for the current block based on a disparity motion vector or an IDV of a neighboring block.

The video coder may determine a block in a reference picture in a reference view based on a location in the reference picture to which the disparity vector refers based on the disparity vector starting from a bottom-right pixel in a center 2×2 sub-block within the current block. The video coder may inter-prediction code (e.g., encode or decode) the current block based on the determined block. For instance, the video coder may utilize the motion information of the determined block if the determined block is to be used for inter-prediction coding the current block. As another example, the video coder may utilize pixel values of a reconstruction of the determined block to determine a residual block for the current block. In these examples, the disparity vector may be considered as a disparity motion vector.

Figure 13:
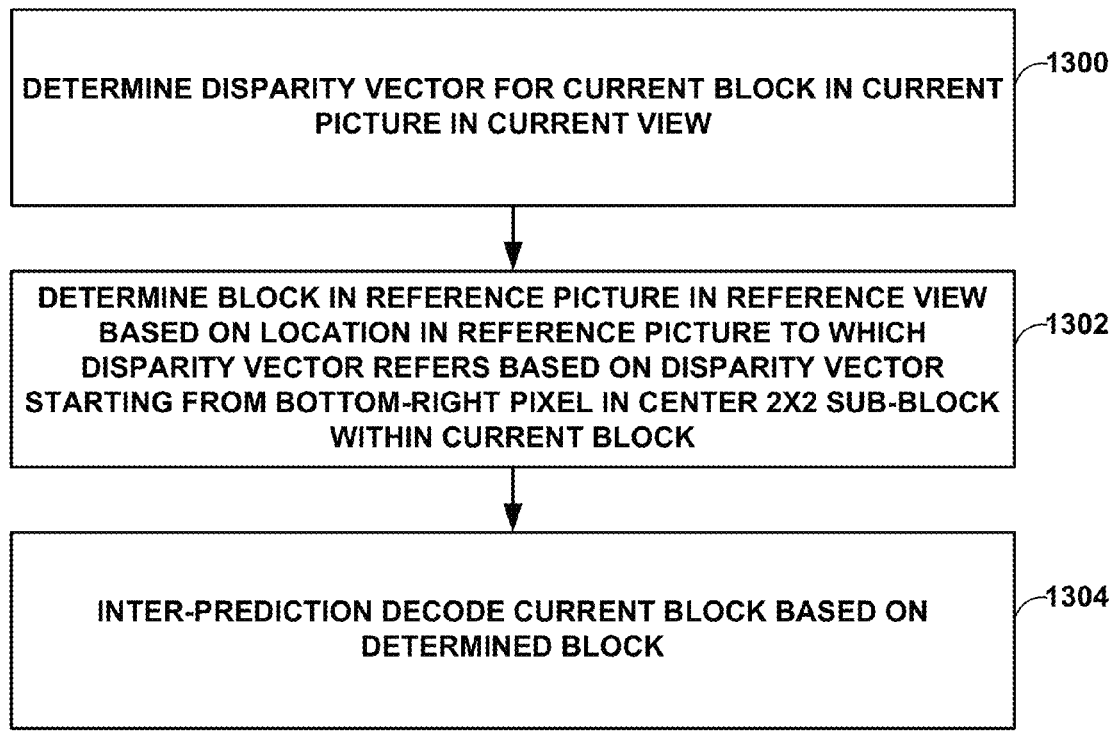
FIG. 13 is a flowchart illustrating an example method of video decoding.

FIG. 13 is a flowchart illustrating an example method of video decoding. As illustrated, video decoder 30 may determine a disparity vector for a current block in a current picture in a current view (1300). There may be various ways in which video decoder 30 may determine the disparity vector including the NBDV derivation techniques and further refinement of the derived disparity vector. For example, video decoder 30 may check the motion information of neighboring blocks (spatial or temporal neighboring block) as stored in video data memory 1200 to determine whether any of the neighboring blocks is inter-predicted with a disparity motion vector or an IDV exists for a neighboring block. Video decoder 30 may convert the disparity motion vector of a neighboring block or IDV of neighboring block as the disparity vector of the current block, and may further refine the disparity vector to determine a new disparity vector. In this example, the disparity vector refers to unrefined disparity vector or the refined disparity vector.

Video decoder 30 may determine a block in a reference picture in a reference view based on a location in the reference picture to which the disparity vector refers based on the disparity vector starting from a bottom-right pixel in a center 2×2 sub-block within the current block (1302). For example, FIG. 4 illustrates current block 38 that includes a sub-block 48 within the center of current block 38. Because at least one of the height and width of current block 38 is even, there is no single center pixel in current block 38. Rather, four pixels that form sub-block 48 are within the center of current block 38. To determine the block in reference picture 34, video decoder 30 may start the disparity vector from the bottom-right pixel in sub-block 44 (e.g., position 46).

As illustrated, the disparity vector DV2 starts from position 46 and refers to location C3 in reference picture 34. Video decoder 30 may determine a 4×4 block that covers the location in the reference picture to which the disparity vector refers. For instance, video decoder 30 may determine that block 42 covers location C3 in reference picture 34 to which disparity vector DV2 refers.

In some examples, to determine the block in the reference picture, video decoder 30 may determine an x-coordinate and y-coordinate for the location in the reference picture. The x-coordinate for the location in the reference picture equals Clip3(0, PicWidthInSamples$_L$−1, xP+((nPSW)>>1)+((mvDisp[0]+2)>>2)), and the y-coordinate for the location in the reference picture equals Clip3(0, PicHeightInSamples$_L$−1, yP+((nPSH)>>1)+((mvDisp[1]+2)>>2)). PicWidthInSamples$_L$ equals a width of the reference picture, and PicHeightInSamples$_L$ equals a height of the reference picture. xP equals an x-coordinate of a top-left corner of the current block, and yP equals a y-coordinate of a top-left corner of the current block. nPSW equals a width of the current block, and nPSH equals a height of the current block. mvDisp[0] equals an x-component of the disparity vector, and mvDisp[1] equal a y-component of the disparity vector. For instance, an x-coordinate for the bottom-right pixel in the center 2×2 sub-block within the current block equals xP+((nPSW)>>1), and a y-coordinate for the bottom-right pixel in the center 2×2 sub-block within the current block equals yP+((nPSH)>>1).

Video decoder 30 may inter-prediction decode the current block based on the determined block (1304). For instance, video decoder 30 may inter-prediction decode the current block using one of inter-view motion prediction or inter-view residual prediction if the determined block is determined to be used for inter-prediction decoding. As one example, video decoder 30 may form a list of candidate motion vector predictors, and may insert motion information from the determined block in the list of candidate motion vector predictors. In this example, video decoder 30 may inter-prediction decode the current block using the motion information of the determined block if the motion information of the determined block is selected from the list of candidate motion vector predictors (e.g., an index into the list of candidate motion vector predictors refers to the motion information of the block referred to by the disparity vector based on the disparity vector starting from a bottom-right pixel of the center 2×2 sub-block within the current block).

As another example, video decoder 30 may utilize a reconstruction of the determined block as a predictive block. In this example, video decoder 30 receives residual values that video decoder 30 adds to the determined block to inter-prediction decode the current block. Because the disparity vector refers to a predictive block (e.g., the reference block functions as a predictive block), the disparity vector may be considered as a disparity motion vector.

Figure 14:
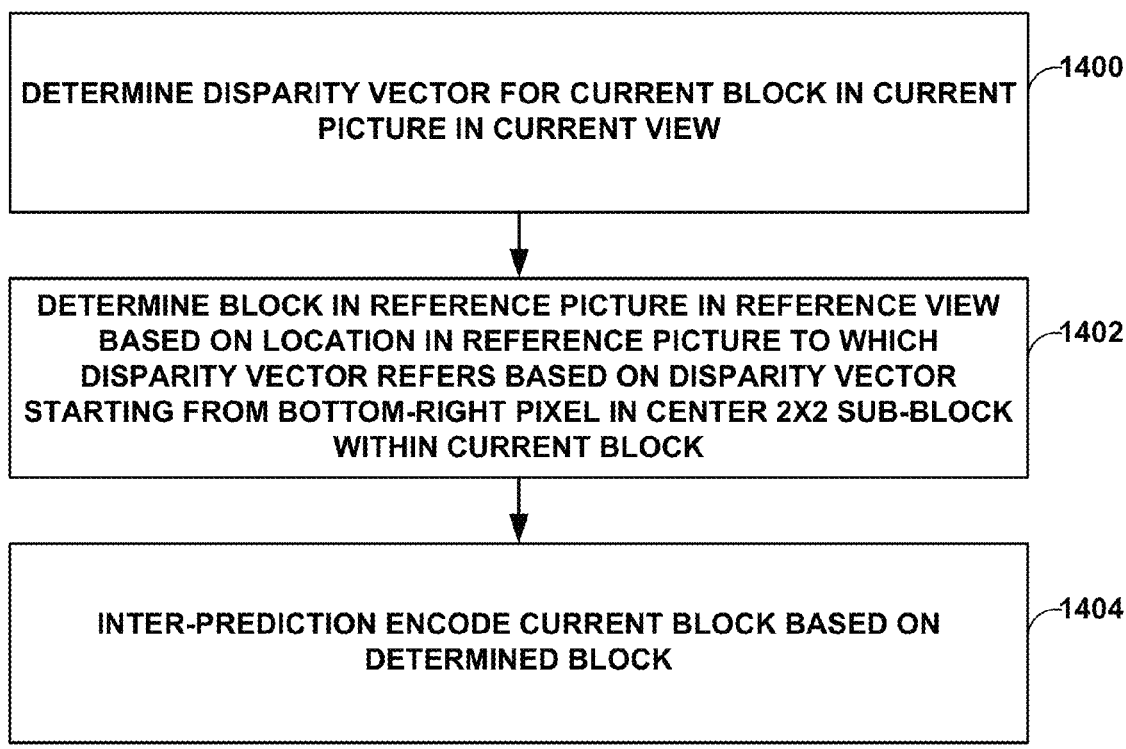
FIG. 14 is a flowchart illustrating an example method of video encoding.

FIG. 14 is a flowchart illustrating an example method of video encoding. As illustrated, video encoder 20 may determine a disparity vector for a current block in a current picture in a current view (1400). There may be various ways in which video encoder 20 may determine the disparity vector including the NBDV derivation techniques and further refinement of the derived disparity vector. For example, video encoder 20 may check the motion information of neighboring blocks (spatial or temporal neighboring block) as stored in video data memory 1300 to determine whether any of the neighboring blocks is inter-predicted with a disparity motion vector or an IDV exists for a neighboring block. Video encoder 20 may convert the disparity motion vector of a neighboring block or IDV of neighboring block to the disparity vector of the current block, and may further refine the disparity vector to determine a new disparity vector. In this example, the disparity vector refers to an unrefined disparity vector or the refined disparity vector. In general, in this disclosure, including the above example illustrated in FIG. 13, a disparity vector is used to refer to an unrefined disparity vector or a refined disparity vector.

Video encoder 20 may determine a block in a reference picture in a reference view based on a location in the reference picture to which the disparity vector refers based on the disparity vector starting from a bottom-right pixel in a center 2×2 sub-block within the current block (1402). For example, FIG. 4 illustrates current block 38 that includes a sub-block 48 within the center of current block 38. Because at least one of the height and width of current block 38 is even, there is no single center pixel in current block 38. Rather, four pixels that form sub-block 48 are within the center of current block 38. To determine the block in reference picture 34, video encoder 20 may start the disparity vector from the bottom-right pixel in sub-block 44 (e.g., position 46).

As illustrated, the disparity vector DV2 starts from position 46 and refers to location C3 in reference picture 34. Video encoder 20 may determine a 4×4 block that covers the location in the reference picture to which the disparity vector refers. For instance, video encoder 20 may determine that block 42 covers location C3 in reference picture 34 to which disparity vector DV2 refers.

In some examples, to determine the block in the reference picture, video encoder 20 may determine an x-coordinate and y-coordinate for the location in the reference picture. The x-coordinate for the location in the reference picture equals Clip3(0, PicWidthInSamples$_L$−1, xP+((nPSW)>>1)+((mvDisp[0]+2)>>2)), and the y-coordinate for the location in the reference picture equals Clip3(0, PicHeightInSamples$_L$−1, yP+((nPSH)>>1)+((mvDisp[1]+2)>>2)). PicWidthInSamples$_L$ equals a width of the reference picture, and PicHeightInSamples$_L$ equals a height of the reference picture. xP equals an x-coordinate of a top-left corner of the current block, and yP equals a y-coordinate of a top-left corner of the current block. nPSW equals a width of the current block, and nPSH equals a height of the current block. mvDisp[0] equals an x-component of the disparity vector, and mvDisp[1] equal a y-component of the disparity vector. For instance, an x-coordinate for the bottom-right pixel in the center 2×2 sub-block within the current block equals xP+((nPSW)>>1), and a y-coordinate for the bottom-right pixel in the center 2×2 sub-block within the current block equals yP+((nPSH)>>1).

Video encoder 20 may inter-prediction encode the current block based on the determined block (1404). For instance, video encoder 20 may inter-prediction encode the current block using one of inter-view motion prediction or inter-view residual prediction if the determined block is determined to be used for inter-prediction encoding. As one example, video encoder 20 may form a list of candidate motion vector predictors, and may insert motion information from the determined block in the list of candidate motion vector predictors. In this example, video encoder 20 may inter-prediction encode the current block using the motion information of the determined block if the motion information of the determined block is selected from the list of candidate motion vector predictors (e.g., an index into the list of candidate motion vector predictors refers to the motion information of the block referred to by the disparity vector based on the disparity vector starting from a bottom-right pixel of the center 2×2 sub-block within the current block).

As another example, video encoder 20 may utilize a reconstruction of the determined block as a predictive block. In this example, video encoder 20 determines residual values between the determined block and the current block and outputs residual values. Because the disparity vector refers to a predictive block (e.g., the reference block functions as a predictive block), the disparity vector may be considered as a disparity motion vector.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of video decoding, the method comprising:
    determining a disparity vector for a current block in a current picture in a current view;
    determining a block in a reference picture in a reference view based on a location in the reference picture to which the disparity vector refers based on the disparity vector starting from a bottom-right pixel in a center 2×2 sub-block within the current block, wherein determining the block in the reference picture in the reference view comprises:
        determining an x-coordinate for the location in the reference picture based on a width of the reference picture, an x-coordinate of a top-left corner of the current block, a width of the current block, and an x-component of the disparity vector, wherein the x-coordinate for the location in the reference picture equals Clip3(0, PicWidthInSamples$_L$−1, xP+ ((nPSW)>>1)+((mvDisp[0]+2)>>2)), wherein PicWidthInSamples$_L$ equals the width of the reference picture, wherein xP equals the x-coordinate of the top-left corner of the current block, wherein nPSW equals the width of the current block, wherein mvDisp[0] equals the x-component of the disparity vector, wherein the >> is a shift operation, and wherein the Clip3 operation clips a third operand to a range of a first and a second operand, determining a y-coordinate for the location in the reference picture based on a height of the reference picture, a y-coordinate of the top-left corner of the current block, a height of the current block, and a y-component of the disparity vector, wherein the y-coordinate for the location in the reference picture equals Clip3(0, PicHeightInSamples$_L$−1, yP+ ((nPSH)>>1)+((mvDisp[1]+2)>>2)), wherein PicHeightInSamples$_L$ equals the height of the reference picture, wherein yP equals the y-coordinate of a top-left corner of the current block, wherein nPSH equals the height of the current block, and wherein mvDisp[1] equals the v-component of the disparity vector, and determining the block that covers the determined x- and y-coordinates; and inter-prediction decoding the current block based on the determined block.

2. The method of claim 1, wherein inter-prediction decoding the current block comprises one of inter-prediction decoding the current block based on motion information of the determined block or inter-prediction decoding the current block based on a reconstruction of the determined block.

3. The method of claim 1, wherein determining the block in the reference picture comprises determining a 4×4 block that covers the location in the reference picture to which the disparity vector refers.

4. The method of claim 1, further comprising:
inserting motion information of the determined block in a list of candidate motion vector predictors,
wherein inter-prediction decoding the current block comprises inter-prediction decoding the current block using the motion information of the determined block if the motion information of the determined block is selected from the list of candidate motion vector predictors.

5. A method of video encoding, the method comprising:
determining a disparity vector for a current block in a current picture in a current view;
determining a block in a reference picture in a reference view based on a location in the reference picture to which the disparity vector refers based on the disparity vector starting from a bottom-right pixel in a center 2×2 sub-block within the current block, wherein determining the block in the reference picture in the reference view comprises:
  determining an x-coordinate for the location in the reference picture based on a width of the reference picture, an x-coordinate of a top-left corner of the current block, a width of the current block, and an x-component of the disparity vector, wherein the x-coordinate for the location in the reference picture equals Clip3(0, PicWidthInSamples$_L$−1, xP+ ((nPSW)>>1)+((mvDisp[0]+2)>>2)), wherein PicWidthInSamples$_L$ equals the width of the reference picture, wherein xP equals the x-coordinate of the top-left corner of the current block, wherein nPSW equals the width of the current block, wherein mvDisp[0] equals the x-component of the disparity vector, wherein the >> is a shift operation, and wherein the Clip3 operation clips a third operand to a range of a first and a second operand,
  determining a y-coordinate for the location in the reference picture based on a height of the reference picture, a y-coordinate of the top-left corner of the current block, a height of the current block, and a y-component of the disparity vector, wherein the y-coordinate for the location in the reference picture equals Clip3(0, PicHeightInSamples$_L$−1, yP+ ((nPSH)>>1)+((mvDisp[1]+2)>>2)), wherein PicHeightInSamples$_L$ equals the height of the reference picture, wherein yP equals the y-coordinate of the top-left corner of the current block, wherein nPSH equals the height of the current block, and wherein mvDisp[1] equals the y-component of the disparity vector, and
determining the block that covers the determined x- and y-coordinates; and
inter-prediction encoding the current block based on the determined block.

6. The method of claim 5, wherein inter-prediction encoding the current block comprises one of inter-prediction encoding the current block based on motion information of the determined block or inter-prediction encoding the current block based on a reconstruction of the determined block.

7. The method of claim 5, wherein determining the block in the reference picture comprises determining a 4×4 block that covers the location in the reference picture to which the disparity vector refers.

8. The method of claim 5, further comprising:
inserting motion information of the determined block in a list of candidate motion vector predictors,
wherein inter-prediction encoding the current block comprises inter-prediction encoding the current block using the motion information of the determined block if the motion information of the determined block is selected from the list of candidate motion vector predictors.

9. A device for video coding, the device comprising:
a video data memory configured to store video data; and
a video coder comprising one or more processors and configured to:
  determine a disparity vector for a current block in a current picture in a current view based on the stored video data;
  determine a block in a reference picture in a reference view based on a location in the reference picture to which the disparity vector refers based on the disparity vector starting from a bottom-right pixel in a center 2×2 sub-block within the current block, wherein to determine the block in the reference picture in the reference view, the video coder is configured to:
    determine an x-coordinate for the location in the reference picture based on a width of the reference picture, an x-coordinate of a top-left corner of the current block, a width of the current block, and an x-component of the disparity vector, wherein the x-coordinate for the location in the reference picture equals Clip3(0, PicWidthInSamples$_L$−1, xP+ ((nPSW)>>1)+((mvDisp[0]+2) >>2)), wherein PicWidthInSamples$_L$ equals the width of the reference picture, wherein xP equals the x-coordinate of the top-left corner of the current block, wherein nPSW equals the width of the current block, wherein mvDisp[0] equals the x-component of the disparity vector, wherein the >> is a shift operation, and wherein the Clip3 operation clips a third operand to a range of a first and a second operand, determine a y-coordinate for the location in the reference picture based on a height of the reference picture, a y-coordinate of the top-left corner of the current block, a height of the current block, and a y-component of the disparity vector, wherein the y-coordinate for the location in the reference picture equals Clip3(0, PicHeightInSamples$_L$−1, yP+((nPSH)>>1)+((mvDisp[1]+2)>>2)), wherein PicHeightInSamples$_L$ equals the height of the reference picture, wherein yP equals the y-coordinate of a top-left corner of the current block, wherein nPSH equals the height of the current block, and wherein mvDisp[1] equals the y-component of the disparity vector, and determine the block that covers the determined x- and y-coordinates; and inter-prediction code the current block based on the determined block.

10. The device of claim 9, wherein to inter-prediction code the current block, the video coder is configured to one of inter-prediction code the current block based on motion information of the determined block or inter-prediction code the current block based on a reconstruction of the determined block.

11. The device of claim 9, wherein to determine the block in the reference picture, the video coder is configured to determine a 4×4 block that covers the location in the reference picture to which the disparity vector refers.

12. The device of claim 9, wherein the video coder is configured to insert motion information of the determined block in a list of candidate motion vector predictors, and wherein to inter-prediction code the current block, the video coder is configured to inter-prediction code the current block using the motion information of the determined block if the motion information of the determined block is selected from the list of candidate motion vector predictors.

13. The device of claim 9, wherein the device comprises one of:

a microprocessor;

an integrated circuit; or a wireless communication device that includes the video coder.

14. A non-transitory computer-readable storage medium having instructions stored thereon that when executed cause one or more processors of a device for video coding to:

determine a disparity vector for a current block in a current picture in a current view;

determine a block in a reference picture in a reference view based on a location in the reference picture to which the disparity vector refers based on the disparity vector starting from a bottom-right pixel in a center 2×2 sub-block within the current block, wherein the instructions that cause the one or more processors to determine the block in the reference picture in the reference view comprise instructions that cause the one or more processors to:

determine an x-coordinate for the location in the reference picture based on a width of the reference picture, an x-coordinate of a top-left corner of the current block, a width of the current block, and an x-component of the disparity vector, wherein the x-coordinate for the location in the reference picture equals Clip3(0, PicWidthInSamples$_L$−1, xP+((nPSW)>>1)+((mvDisp[0]+2)>>2)), wherein PicWidthInSamples$_L$ equals the width of the reference picture, wherein xP equals the x-coordinate of the top-left corner of the current block, wherein nPSW equals the width of the current block, wherein mvDisp[0] equals the x-component of the disparity vector, wherein the >> is a shift operation, and wherein the Clip3 operation clips a third operand to a range of a first and a second operand, determine a y-coordinate for the location in the reference picture based on a height of the reference picture, a y-coordinate of the top-left corner of the current block, a height of the current block, and a y-component of the disparity vector, wherein the y-coordinate for the location in the reference picture equals Clip3(0, PicHeightInSamples$_L$−1, yP+((nPSH) >>1)+((mvDisp[1]+2)>>2)), wherein PicHeightInSamples$_L$ equals the height of the reference picture, wherein yP equals the y-coordinate of a top-left corner of the current block, wherein nPSH equals the height of the current block, and wherein mvDisp[1] equals the y-component of the disparity vector, and determine the block that covers the determined x- and y-coordinates; and inter-prediction code the current block based on the determined block.

15. The non-transitory computer-readable storage medium of claim 14, wherein the instructions that cause the one or more processors to determine the block in the reference picture comprise instructions that cause the one or more processors to determine a 4×4 block that covers the location in the reference picture to which the disparity vector refers.

* * * * *